(12) United States Patent
Holz et al.

(10) Patent No.: US 12,095,969 B2
(45) Date of Patent: *Sep. 17, 2024

(54) AUGMENTED REALITY WITH MOTION SENSING

(71) Applicant: ULTRAHAPTICS IP TWO LIMITED, Bristol (GB)

(72) Inventors: David S. Holz, San Francisco, CA (US); Neeloy Roy, San Francisco, CA (US); Hongyuan He, San Francisco, CA (US)

(73) Assignee: ULTRAHAPTICS IP TWO LIMITED, Bristol (GB)

( * ) Notice: Subject to any disclaimer, the term of this patent is extended or adjusted under 35 U.S.C. 154(b) by 0 days.

This patent is subject to a terminal disclaimer.

(21) Appl. No.: 18/374,661

(22) Filed: Sep. 28, 2023

(65) Prior Publication Data

US 2024/0031547 A1  Jan. 25, 2024

Related U.S. Application Data

(63) Continuation of application No. 17/972,288, filed on Oct. 24, 2022, now Pat. No. 11,778,159, which is a
(Continued)

(51) Int. Cl.
*H04N 13/239* (2018.01)
*G02B 27/00* (2006.01)
(Continued)

(52) U.S. Cl.
CPC ....... *H04N 13/239* (2018.05); *G02B 27/0093* (2013.01); *G02B 27/017* (2013.01);
(Continued)

(58) Field of Classification Search
CPC .......... G02B 2027/0187; G02B 27/017; G02B 27/0093; G06F 3/011; G06F 3/017; H04N 5/2256; G06T 19/006
See application file for complete search history.

(56) References Cited

U.S. PATENT DOCUMENTS 2,665,041 A  1/1954  Maffucci
4,175,862 A  11/1979  DiMatteo et al.
(Continued)

FOREIGN PATENT DOCUMENTS

CN  1984236 A  6/2007
CN  101124534 A  2/2008
(Continued)

OTHER PUBLICATIONS

"Augmediated reality system based on 3D camera selfgesture sensing"—Raymond Lo, Alexander Chen, Valmiki Rampersad, Jason Huang, Han Wu, Steve Mann; 2013 IEEE International Symposium on Technology and Society (ISTAS); Jun. 27-29, 2013. (Year: 2013).*

(Continued)

*Primary Examiner* — Mainul Hasan
(74) *Attorney, Agent, or Firm* — HAYNES BEFFEL & WOLFELD LLP; Andrew L. Dunlap; Paul A. Durdik

(57) ABSTRACT

A motion sensory and imaging device capable of acquiring imaging information of the scene and providing at least a near real time pass-through of imaging information to a user. The sensory and imaging device can be used stand-alone or coupled to a wearable or portable device to create a wearable sensory system capable of presenting to the wearer the imaging information augmented with virtualized or created presentations of information.

20 Claims, 5 Drawing Sheets

Related U.S. Application Data continuation of application No. 17/133,616, filed on Dec. 23, 2020, now Pat. No. 11,483,538, which is a continuation of application No. 16/505,265, filed on Jul. 8, 2019, now Pat. No. 10,880,537, which is a continuation of application No. 14/821,499, filed on Aug. 7, 2015, now Pat. No. 10,349,036.

(60) Provisional application No. 62/035,008, filed on Aug. 8, 2014.

(51) Int. Cl.
| | | |
|---|---|---|
| *G02B 27/01* | (2006.01) | |
| *G06F 3/01* | (2006.01) | |
| *G06T 19/00* | (2011.01) | |
| *H04N 13/257* | (2018.01) | |
| *H04N 13/296* | (2018.01) | |
| *H04N 23/11* | (2023.01) | |
| *H04N 23/54* | (2023.01) | |
| *H04N 23/56* | (2023.01) | |
| *H04S 7/00* | (2006.01) | |

(52) U.S. Cl.
CPC .............. *G06F 3/011* (2013.01); *G06F 3/017* (2013.01); *G06T 19/006* (2013.01); *H04N 13/257* (2018.05); *H04N 13/296* (2018.05); *H04N 23/11* (2023.01); *H04N 23/54* (2023.01); *H04N 23/56* (2023.01); *G02B 2027/0134* (2013.01); *G02B 2027/0138* (2013.01); *G02B 2027/0187* (2013.01); *H04S 7/304* (2013.01); *H04S 2400/11* (2013.01); *H04S 2400/15* (2013.01)

(56) References Cited

U.S. PATENT DOCUMENTS

| | | |
|---|---|---|
| 4,521,831 A | 6/1985 | Thayer |
| 4,734,939 A | 4/1988 | Copp |
| 4,876,455 A | 10/1989 | Sanderson et al. |
| 4,879,659 A | 11/1989 | Bowlin et al. |
| 4,893,223 A | 1/1990 | Arnold |
| 5,038,258 A | 8/1991 | Koch et al. |
| 5,134,661 A | 7/1992 | Reinsch |
| 5,282,067 A | 1/1994 | Liu |
| 5,434,617 A | 7/1995 | Bianchi |
| 5,454,043 A | 9/1995 | Freeman |
| 5,574,511 A | 11/1996 | Yang et al. |
| 5,581,276 A | 12/1996 | Cipolla et al. |
| 5,594,469 A | 1/1997 | Freeman et al. |
| 5,659,475 A | 8/1997 | Brown |
| 5,691,737 A | 11/1997 | Ito et al. |
| 5,742,263 A | 4/1998 | Wang et al. |
| 5,900,849 A | 5/1999 | Gallery |
| 5,900,863 A | 5/1999 | Numazaki |
| 5,940,538 A | 8/1999 | Spiegel et al. |
| 6,002,808 A | 12/1999 | Freeman |
| 6,031,161 A | 2/2000 | Baltenberger |
| 6,031,661 A | 2/2000 | Tanaami |
| 6,061,064 A | 5/2000 | Reichlen |
| 6,072,494 A | 6/2000 | Nguyen |
| 6,075,895 A | 6/2000 | Qiao et al. |
| 6,147,678 A | 11/2000 | Kumar et al. |
| 6,154,558 A | 11/2000 | Hsieh |
| 6,181,343 B1 | 1/2001 | Lyons |
| 6,184,326 B1 | 2/2001 | Razavi et al. |
| 6,184,926 B1 | 2/2001 | Khosravi et al. |
| 6,195,104 B1 | 2/2001 | Lyons |
| 6,204,852 B1 | 3/2001 | Kumar et al. |
| 6,252,598 B1 | 6/2001 | Segen |
| 6,263,091 B1 | 7/2001 | Jain et al. |
| 6,346,933 B1 | 2/2002 | Lin |
| 6,417,970 B1 | 7/2002 | Travers et al. |
| 6,421,453 B1 | 7/2002 | Kanevsky et al. |
| 6,463,402 B1 | 10/2002 | Bennett et al. |
| 6,492,986 B1 | 12/2002 | Metaxas et al. |
| 6,493,041 B1 | 12/2002 | Hanko et al. |
| 6,498,628 B2 | 12/2002 | Iwamura |
| 6,578,203 B1 | 6/2003 | Anderson, Jr. et al. |
| 6,603,867 B1 | 8/2003 | Sugino et al. |
| 6,661,918 B1 | 12/2003 | Gordon et al. |
| 6,674,877 B1 | 1/2004 | Jojic et al. |
| 6,702,494 B2 | 3/2004 | Dumler et al. |
| 6,734,911 B1 | 5/2004 | Lyons |
| 6,738,424 B1 | 5/2004 | Allmen et al. |
| 6,771,294 B1 | 8/2004 | Pulli et al. |
| 6,798,628 B1 | 9/2004 | Macbeth |
| 6,804,654 B2 | 10/2004 | Kobylevsky et al. |
| 6,804,656 B1 | 10/2004 | Rosenfeld et al. |
| 6,814,656 B2 | 11/2004 | Rodriguez |
| 6,819,796 B2 | 11/2004 | Hong et al. |
| 6,901,170 B1 | 5/2005 | Terada et al. |
| 6,919,880 B2 | 7/2005 | Morrison et al. |
| 6,950,534 B2 | 9/2005 | Cohen et al. |
| 6,993,157 B1 | 1/2006 | Oue et al. |
| 7,050,606 B2 | 5/2006 | Paul et al. |
| 7,152,024 B2 | 12/2006 | Marschner et al. |
| 7,213,707 B2 | 5/2007 | Hubbs et al. |
| 7,215,828 B2 | 5/2007 | Luo |
| 7,236,611 B2 | 6/2007 | Roberts et al. |
| 7,244,233 B2 | 7/2007 | Krantz et al. |
| 7,257,237 B1 | 8/2007 | Luck et al. |
| 7,259,873 B2 | 8/2007 | Sikora et al. |
| D552,152 S | 10/2007 | Almond |
| 7,289,645 B2 | 10/2007 | Yamamoto et al. |
| 7,308,112 B2 | 12/2007 | Fujimura et al. |
| 7,340,077 B2 | 3/2008 | Gokturk et al. |
| 7,483,049 B2 | 1/2009 | Aman et al. |
| 7,519,223 B2 | 4/2009 | Dehlin et al. |
| 7,532,206 B2 | 5/2009 | Morrison et al. |
| 7,536,032 B2 | 5/2009 | Bell |
| 7,542,586 B2 | 6/2009 | Johnson |
| 7,598,942 B2 | 10/2009 | Underkoffler et al. |
| 7,606,417 B2 | 10/2009 | Steinberg et al. |
| 7,646,372 B2 | 1/2010 | Marks et al. |
| 7,656,372 B2 | 2/2010 | Sato et al. |
| 7,665,041 B2 | 2/2010 | Wilson et al. |
| 7,692,625 B2 | 4/2010 | Morrison et al. |
| 7,743,348 B2 | 6/2010 | Robbins et al. |
| D620,514 S | 7/2010 | Kim et al. |
| D627,815 S | 11/2010 | Oba |
| 7,831,932 B2 | 11/2010 | Josephsoon et al. |
| 7,840,031 B2 | 11/2010 | Albertson et al. |
| 7,861,188 B2 | 12/2010 | Josephsoon et al. |
| 7,940,885 B2 | 5/2011 | Stanton et al. |
| 7,948,493 B2 | 5/2011 | Klefenz et al. |
| 7,961,174 B1 | 6/2011 | Markovic et al. |
| 7,961,934 B2 | 6/2011 | Thrun et al. |
| 7,971,156 B2 | 6/2011 | Albertson et al. |
| 7,980,885 B2 | 7/2011 | Gattwinkel et al. |
| 8,023,698 B2 | 9/2011 | Niwa et al. |
| 8,035,624 B2 | 10/2011 | Bell et al. |
| 8,045,825 B2 | 10/2011 | Shimoyama et al. |
| 8,064,704 B2 | 11/2011 | Kim et al. |
| 8,085,339 B2 | 12/2011 | Marks |
| 8,086,971 B2 | 12/2011 | Radivojevic et al. |
| 8,111,239 B2 | 2/2012 | Pryor et al. |
| 8,112,719 B2 | 2/2012 | Hsu et al. |
| 8,126,985 B1 | 2/2012 | Kandekar et al. |
| D656,175 S | 3/2012 | Fong |
| 8,144,233 B2 | 3/2012 | Fukuyama |
| 8,185,176 B2 | 5/2012 | Mangat et al. |
| 8,213,707 B2 | 7/2012 | Li et al. |
| 8,218,858 B2 | 7/2012 | Gu |
| 8,229,134 B2 | 7/2012 | Duraiswami et al. |
| 8,235,529 B1 | 8/2012 | Raffle et al. |
| 8,244,233 B2 | 8/2012 | Chang et al. |
| 8,249,345 B2 | 8/2012 | Wu et al. |
| 8,270,669 B2 | 9/2012 | Aichi et al. |
| 8,289,162 B2 | 10/2012 | Mooring et al. |
| 8,290,208 B2 | 10/2012 | Kurtz et al. |
| 8,304,727 B2 | 11/2012 | Lee et al. |

(56) References Cited

U.S. PATENT DOCUMENTS

| | | |
|---|---|---|
| 8,319,832 B2 | 11/2012 | Nagata et al. |
| 8,363,010 B2 | 1/2013 | Nagata |
| 8,375,473 B2 | 2/2013 | Celona et al. |
| 8,395,600 B2 | 3/2013 | Kawashima et al. |
| 8,396,252 B2 | 3/2013 | El Dokor |
| 8,405,680 B1 | 3/2013 | Cardoso Lopes et al. |
| 8,432,377 B2 | 4/2013 | Newton |
| 8,471,848 B2 | 6/2013 | Tschesnok |
| 8,514,221 B2 | 8/2013 | King et al. |
| D689,539 S | 9/2013 | Zaletel et al. |
| 8,542,320 B2 | 9/2013 | Berestov et al. |
| 8,553,037 B2 | 10/2013 | Smith et al. |
| 8,582,809 B2 | 11/2013 | Halimeh et al. |
| 8,593,417 B2 | 11/2013 | Kawashima et al. |
| 8,605,202 B2 | 12/2013 | Muijs et al. |
| 8,631,355 B2 | 1/2014 | Murillo et al. |
| 8,638,989 B2 | 1/2014 | Holz |
| 8,659,594 B2 | 2/2014 | Kim et al. |
| 8,659,658 B2 | 2/2014 | Vassigh et al. |
| 8,661,571 B1 | 3/2014 | Teetzel et al. |
| 8,693,731 B2 | 4/2014 | Holz et al. |
| 8,738,523 B1 | 5/2014 | Sanchez et al. |
| 8,744,122 B2 | 6/2014 | Salgian et al. |
| 8,744,645 B1 | 6/2014 | Vaghefinazari et al. |
| 8,751,979 B1 | 6/2014 | Socha |
| 8,768,022 B2 | 7/2014 | Miga et al. |
| 8,773,512 B1 | 7/2014 | Rafii |
| 8,781,171 B2 | 7/2014 | King et al. |
| 8,781,234 B2 | 7/2014 | Zhang et al. |
| 8,817,087 B2 | 8/2014 | Weng et al. |
| 8,824,749 B2 | 9/2014 | Leyvand et al. |
| 8,842,084 B2 | 9/2014 | Andersson et al. |
| 8,843,857 B2 | 9/2014 | Berkes et al. |
| 8,872,914 B2 | 10/2014 | Gobush |
| D717,361 S | 11/2014 | Nikaido |
| 8,878,749 B1 | 11/2014 | Wu et al. |
| 8,891,868 B1 | 11/2014 | Ivanchenko |
| 8,907,982 B2 | 12/2014 | Zontrop et al. |
| 8,922,590 B1 | 12/2014 | Luckett, Jr. et al. |
| 8,929,609 B2 | 1/2015 | Padovani et al. |
| 8,930,852 B2 | 1/2015 | Chen et al. |
| 8,942,881 B2 | 1/2015 | Hobbs et al. |
| 8,954,340 B2 | 2/2015 | Sanchez et al. |
| 8,957,857 B2 | 2/2015 | Lee et al. |
| 9,014,414 B2 | 4/2015 | Katano et al. |
| 9,056,396 B1 | 6/2015 | Linnell |
| 9,058,057 B2 | 6/2015 | Matsuda |
| 9,070,019 B2 | 6/2015 | Holz |
| 9,119,670 B2 | 9/2015 | Yang et al. |
| 9,122,354 B2 | 9/2015 | Sharma |
| 9,124,778 B1 | 9/2015 | Crabtree |
| 9,170,674 B2 | 10/2015 | Forutanpour et al. |
| 9,274,742 B2 | 3/2016 | Phillips |
| D756,443 S | 5/2016 | Ju et al. |
| 9,459,697 B2 | 10/2016 | Bedikian et al. |
| 9,600,935 B2 | 3/2017 | Cohen |
| 9,741,169 B1 | 8/2017 | Holz |
| 9,766,855 B2 | 9/2017 | Lapidot et al. |
| 9,868,449 B1 | 1/2018 | Holz et al. |
| 10,318,100 B2 | 6/2019 | Abercrombie et al. |
| 10,349,036 B2 | 7/2019 | Holz et al. |
| 10,600,248 B2 | 3/2020 | Holz |
| 10,656,720 B1 | 5/2020 | Holz |
| 10,880,537 B2 | 12/2020 | Holz et al. |
| 11,036,304 B2 | 6/2021 | Holz |
| 11,080,937 B2 | 8/2021 | Holz |
| 11,483,538 B2 * | 10/2022 | Holz .................. G02B 27/017 |
| 11,538,224 B2 | 12/2022 | Holz et al. |
| 11,561,519 B2 | 1/2023 | Gordon et al. |
| 11,778,159 B2 | 10/2023 | Holz et al. |
| 2001/0044858 A1 | 11/2001 | Rekimoto |
| 2001/0052985 A1 | 12/2001 | Ono |
| 2002/0008139 A1 | 1/2002 | Albertelli |
| 2002/0008211 A1 | 1/2002 | Kask |
| 2002/0041327 A1 | 4/2002 | Hildreth et al. |
| 2002/0080094 A1 | 6/2002 | Biocca et al. |
| 2002/0105484 A1 | 8/2002 | Navab et al. |
| 2002/0107637 A1 | 8/2002 | Okamura et al. |
| 2003/0053658 A1 | 3/2003 | Pavlidis |
| 2003/0053659 A1 | 3/2003 | Pavlidis et al. |
| 2003/0076996 A1 | 4/2003 | Neumann et al. |
| 2003/0081141 A1 | 5/2003 | Mazzapica |
| 2003/0085866 A1 | 5/2003 | Bimber et al. |
| 2003/0123703 A1 | 7/2003 | Pavlidis et al. |
| 2003/0152289 A1 | 8/2003 | Luo |
| 2003/0202697 A1 | 10/2003 | Simard et al. |
| 2004/0103111 A1 | 5/2004 | Miller et al. |
| 2004/0125228 A1 | 7/2004 | Dougherty |
| 2004/0125984 A1 | 7/2004 | Ito et al. |
| 2004/0145809 A1 | 7/2004 | Brenner |
| 2004/0155877 A1 | 8/2004 | Hong et al. |
| 2004/0212725 A1 | 10/2004 | Raskar |
| 2005/0007673 A1 | 1/2005 | Chaoulov et al. |
| 2005/0063564 A1 | 3/2005 | Yamamoto et al. |
| 2005/0068518 A1 | 3/2005 | Baney et al. |
| 2005/0094019 A1 | 5/2005 | Grosvenor et al. |
| 2005/0131607 A1 | 6/2005 | Breed |
| 2005/0156888 A1 | 7/2005 | Xie et al. |
| 2005/0168578 A1 | 8/2005 | Gobush |
| 2005/0210105 A1 | 9/2005 | Hirata et al. |
| 2005/0236558 A1 | 10/2005 | Nabeshima et al. |
| 2005/0238201 A1 | 10/2005 | Shamaie |
| 2006/0006235 A1 | 1/2006 | Kurzweil et al. |
| 2006/0017807 A1 | 1/2006 | Lee et al. |
| 2006/0028656 A1 | 2/2006 | Venkatesh et al. |
| 2006/0029296 A1 | 2/2006 | King et al. |
| 2006/0034545 A1 | 2/2006 | Mattes et al. |
| 2006/0050979 A1 | 3/2006 | Kawahara |
| 2006/0056056 A1 | 3/2006 | Ahiska et al. |
| 2006/0072105 A1 | 4/2006 | Wagner |
| 2006/0098899 A1 | 5/2006 | King et al. |
| 2006/0204040 A1 | 9/2006 | Freeman et al. |
| 2006/0210112 A1 | 9/2006 | Cohen et al. |
| 2006/0262421 A1 | 11/2006 | Matsumoto et al. |
| 2006/0273984 A1 | 12/2006 | Wanda et al. |
| 2006/0290950 A1 | 12/2006 | Platt et al. |
| 2007/0014466 A1 | 1/2007 | Baldwin |
| 2007/0042346 A1 | 2/2007 | Weller |
| 2007/0057764 A1 | 3/2007 | Sato et al. |
| 2007/0086621 A1 | 4/2007 | Aggarwal et al. |
| 2007/0130547 A1 | 6/2007 | Boillot |
| 2007/0203904 A1 | 8/2007 | Ren et al. |
| 2007/0206719 A1 | 9/2007 | Suryanarayanan et al. |
| 2007/0230929 A1 | 10/2007 | Niwa et al. |
| 2007/0238956 A1 | 10/2007 | Haras et al. |
| 2008/0002860 A1 | 1/2008 | Super et al. |
| 2008/0013826 A1 | 1/2008 | Hillis et al. |
| 2008/0019576 A1 | 1/2008 | Senftner et al. |
| 2008/0019589 A1 | 1/2008 | Yoon et al. |
| 2008/0030429 A1 | 2/2008 | Hailpern et al. |
| 2008/0031492 A1 | 2/2008 | Lanz |
| 2008/0056752 A1 | 3/2008 | Denton et al. |
| 2008/0064954 A1 | 3/2008 | Adams et al. |
| 2008/0106637 A1 | 5/2008 | Nakao et al. |
| 2008/0106746 A1 | 5/2008 | Shpunt et al. |
| 2008/0110994 A1 | 5/2008 | Knowles et al. |
| 2008/0118091 A1 | 5/2008 | Serfaty et al. |
| 2008/0126937 A1 | 5/2008 | Pachet |
| 2008/0170776 A1 | 7/2008 | Albertson et al. |
| 2008/0187175 A1 | 8/2008 | Kim et al. |
| 2008/0244468 A1 | 10/2008 | Nishihara et al. |
| 2008/0246759 A1 | 10/2008 | Summers |
| 2008/0273764 A1 | 11/2008 | Scholl |
| 2008/0278589 A1 | 11/2008 | Thorn |
| 2008/0291160 A1 | 11/2008 | Rabin |
| 2008/0304740 A1 | 12/2008 | Sun et al. |
| 2008/0317292 A1 | 12/2008 | Baker et al. |
| 2008/0319356 A1 | 12/2008 | Cain et al. |
| 2009/0002489 A1 | 1/2009 | Yang et al. |
| 2009/0038056 A1 | 2/2009 | Bobbin et al. |
| 2009/0093307 A1 | 4/2009 | Miyaki |
| 2009/0102840 A1 | 4/2009 | Li |
| 2009/0103780 A1 | 4/2009 | Nishihara et al. |
| 2009/0116742 A1 | 5/2009 | Nishihara |

(56) References Cited

U.S. PATENT DOCUMENTS

| | | |
|---|---|---|
| 2009/0122146 A1 | 5/2009 | Zalewski et al. |
| 2009/0153655 A1 | 6/2009 | Ike et al. |
| 2009/0167682 A1* | 7/2009 | Yamashita .............. G06F 3/011 |
| | | 345/158 |
| 2009/0203993 A1 | 8/2009 | Mangat et al. |
| 2009/0203994 A1 | 8/2009 | Mangat et al. |
| 2009/0217211 A1 | 8/2009 | Hildreth et al. |
| 2009/0239587 A1 | 9/2009 | Negron et al. |
| 2009/0257623 A1 | 10/2009 | Tang et al. |
| 2009/0274339 A9 | 11/2009 | Cohen et al. |
| 2009/0278915 A1 | 11/2009 | Kramer et al. |
| 2009/0309710 A1 | 12/2009 | Kakinami |
| 2009/0315837 A1 | 12/2009 | Geiger |
| 2009/0323121 A1 | 12/2009 | Valkenburg et al. |
| 2010/0013662 A1 | 1/2010 | Stude |
| 2010/0013832 A1 | 1/2010 | Xiao et al. |
| 2010/0020078 A1 | 1/2010 | Shpunt |
| 2010/0023015 A1 | 1/2010 | Park |
| 2010/0026963 A1 | 2/2010 | Faulstich |
| 2010/0027845 A1 | 2/2010 | Kim et al. |
| 2010/0046842 A1 | 2/2010 | Conwell |
| 2010/0053164 A1 | 3/2010 | Imai et al. |
| 2010/0053209 A1 | 3/2010 | Rauch et al. |
| 2010/0053612 A1 | 3/2010 | Ou-Yang et al. |
| 2010/0058252 A1 | 3/2010 | Ko |
| 2010/0066737 A1 | 3/2010 | Liu |
| 2010/0066975 A1 | 3/2010 | Rehnstrom |
| 2010/0091110 A1 | 4/2010 | Hildreth |
| 2010/0118123 A1 | 5/2010 | Freedman et al. |
| 2010/0121189 A1 | 5/2010 | Ma et al. |
| 2010/0125815 A1 | 5/2010 | Wang et al. |
| 2010/0127995 A1 | 5/2010 | Rigazio et al. |
| 2010/0141762 A1 | 6/2010 | Siann et al. |
| 2010/0153457 A1 | 6/2010 | Grant |
| 2010/0158372 A1 | 6/2010 | Kim et al. |
| 2010/0175172 A1 | 7/2010 | Dempsey et al. |
| 2010/0177929 A1 | 7/2010 | Kurtz et al. |
| 2010/0194863 A1 | 8/2010 | Lopes et al. |
| 2010/0199229 A1 | 8/2010 | Kipman et al. |
| 2010/0199230 A1 | 8/2010 | Latta et al. |
| 2010/0199232 A1 | 8/2010 | Mistry et al. |
| 2010/0201880 A1 | 8/2010 | Iwamura |
| 2010/0208942 A1 | 8/2010 | Porter et al. |
| 2010/0219934 A1 | 9/2010 | Matsumoto |
| 2010/0222102 A1 | 9/2010 | Rodriguez |
| 2010/0264833 A1 | 10/2010 | Van Endert et al. |
| 2010/0277411 A1 | 11/2010 | Yee et al. |
| 2010/0296698 A1 | 11/2010 | Lien et al. |
| 2010/0302015 A1 | 12/2010 | Kipman et al. |
| 2010/0302357 A1 | 12/2010 | Hsu et al. |
| 2010/0303298 A1 | 12/2010 | Marks et al. |
| 2010/0306712 A1 | 12/2010 | Snook et al. |
| 2010/0309097 A1 | 12/2010 | Raviv et al. |
| 2010/0321377 A1 | 12/2010 | Gay et al. |
| 2011/0007072 A1 | 1/2011 | Khan et al. |
| 2011/0025818 A1 | 2/2011 | Gallmeier et al. |
| 2011/0026765 A1 | 2/2011 | Ivanich et al. |
| 2011/0043806 A1 | 2/2011 | Guetta et al. |
| 2011/0057875 A1 | 3/2011 | Shigeta et al. |
| 2011/0066984 A1 | 3/2011 | Li |
| 2011/0080470 A1 | 4/2011 | Kuno et al. |
| 2011/0080490 A1 | 4/2011 | Clarkson et al. |
| 2011/0090252 A1 | 4/2011 | Yoon et al. |
| 2011/0090407 A1 | 4/2011 | Friedman |
| 2011/0093820 A1 | 4/2011 | Zhang et al. |
| 2011/0107216 A1 | 5/2011 | Bi |
| 2011/0115486 A1 | 5/2011 | Frohlich et al. |
| 2011/0116684 A1 | 5/2011 | Coffman et al. |
| 2011/0119640 A1 | 5/2011 | Berkes et al. |
| 2011/0134112 A1 | 6/2011 | Koh et al. |
| 2011/0145981 A1 | 6/2011 | Teetzel et al. |
| 2011/0148875 A1 | 6/2011 | Kim et al. |
| 2011/0163948 A1* | 7/2011 | Givon .................... G06F 3/038 |
| | | 345/156 |
| 2011/0169726 A1 | 7/2011 | Holmdahl et al. |
| 2011/0173574 A1 | 7/2011 | Clavin et al. |
| 2011/0176146 A1 | 7/2011 | Alvarez Diez et al. |
| 2011/0181509 A1 | 7/2011 | Rautiainen et al. |
| 2011/0193778 A1 | 8/2011 | Lee et al. |
| 2011/0205151 A1 | 8/2011 | Newton et al. |
| 2011/0213664 A1 | 9/2011 | Osterhout et al. |
| 2011/0221672 A1 | 9/2011 | Osterhout et al. |
| 2011/0228978 A1 | 9/2011 | Chen et al. |
| 2011/0234631 A1 | 9/2011 | Kim et al. |
| 2011/0234840 A1 | 9/2011 | Klefenz et al. |
| 2011/0239354 A1 | 10/2011 | Celona et al. |
| 2011/0243451 A1 | 10/2011 | Oyaizu |
| 2011/0251896 A1 | 10/2011 | Impollonia et al. |
| 2011/0261178 A1 | 10/2011 | Lo et al. |
| 2011/0267259 A1 | 11/2011 | Tidemand et al. |
| 2011/0279397 A1 | 11/2011 | Rimon et al. |
| 2011/0286676 A1 | 11/2011 | El Dokor |
| 2011/0289455 A1 | 11/2011 | Reville et al. |
| 2011/0289456 A1 | 11/2011 | Reville et al. |
| 2011/0291925 A1 | 12/2011 | Israel et al. |
| 2011/0291988 A1 | 12/2011 | Bamji et al. |
| 2011/0296353 A1 | 12/2011 | Ahmed et al. |
| 2011/0299737 A1 | 12/2011 | Wang et al. |
| 2011/0304600 A1 | 12/2011 | Yoshida |
| 2011/0304650 A1 | 12/2011 | Campillo et al. |
| 2011/0310007 A1 | 12/2011 | Margolis et al. |
| 2011/0310220 A1 | 12/2011 | McEldowney |
| 2011/0314427 A1 | 12/2011 | Sundararajan |
| 2012/0030637 A1 | 2/2012 | Dey et al. |
| 2012/0038637 A1 | 2/2012 | Marks |
| 2012/0050143 A1 | 3/2012 | Border et al. |
| 2012/0050157 A1 | 3/2012 | Latta et al. |
| 2012/0062444 A1 | 3/2012 | Cok et al. |
| 2012/0065499 A1 | 3/2012 | Chono |
| 2012/0068913 A1* | 3/2012 | Bar-Zeev ............. G02B 27/017 |
| | | 345/8 |
| 2012/0068914 A1 | 3/2012 | Jacobsen et al. |
| 2012/0079420 A1 | 3/2012 | Arriola |
| 2012/0086624 A1 | 4/2012 | Thompson et al. |
| 2012/0086728 A1 | 4/2012 | Mcardle et al. |
| 2012/0092328 A1* | 4/2012 | Flaks .................... G06V 20/10 |
| | | 345/419 |
| 2012/0113223 A1 | 5/2012 | Hilliges et al. |
| 2012/0113316 A1 | 5/2012 | Ueta et al. |
| 2012/0132682 A1 | 5/2012 | Mongan et al. |
| 2012/0143361 A1 | 6/2012 | Kurabayashi et al. |
| 2012/0159380 A1 | 6/2012 | Kocienda et al. |
| 2012/0162214 A1 | 6/2012 | Chavez et al. |
| 2012/0163675 A1 | 6/2012 | Joo et al. |
| 2012/0170800 A1 | 7/2012 | da Silva Frazao et al. |
| 2012/0194420 A1 | 8/2012 | Osterhout et al. |
| 2012/0194517 A1 | 8/2012 | Izadi et al. |
| 2012/0204133 A1 | 8/2012 | Guendelman et al. |
| 2012/0218263 A1 | 8/2012 | Meier et al. |
| 2012/0223959 A1 | 9/2012 | Lengeling |
| 2012/0236288 A1 | 9/2012 | Stanley |
| 2012/0250936 A1 | 10/2012 | Holmgren |
| 2012/0257797 A1 | 10/2012 | Leyvand et al. |
| 2012/0270654 A1 | 10/2012 | Padovani et al. |
| 2012/0274781 A1 | 11/2012 | Shet et al. |
| 2012/0281873 A1 | 11/2012 | Brown et al. |
| 2012/0281884 A1 | 11/2012 | Whillock et al. |
| 2012/0293667 A1 | 11/2012 | Baba et al. |
| 2012/0314030 A1 | 12/2012 | Datta et al. |
| 2012/0320080 A1 | 12/2012 | Giese et al. |
| 2013/0002649 A1 | 1/2013 | Wu et al. |
| 2013/0014052 A1 | 1/2013 | Frey et al. |
| 2013/0019204 A1 | 1/2013 | Kotler et al. |
| 2013/0038694 A1 | 2/2013 | Nichani et al. |
| 2013/0044128 A1 | 2/2013 | Liu et al. |
| 2013/0044951 A1 | 2/2013 | Cherng et al. |
| 2013/0050425 A1 | 2/2013 | Im et al. |
| 2013/0080898 A1 | 3/2013 | Lavian et al. |
| 2013/0086531 A1 | 4/2013 | Sugita et al. |
| 2013/0097566 A1 | 4/2013 | Berglund |
| 2013/0120319 A1 | 5/2013 | Givon |
| 2013/0148852 A1 | 6/2013 | Partis et al. |
| 2013/0156296 A1 | 6/2013 | El Dokor |
| 2013/0182077 A1 | 7/2013 | Holz |

(56) References Cited

U.S. PATENT DOCUMENTS

| | | |
|---|---|---|
| 2013/0182079 A1 | 7/2013 | Holz |
| 2013/0182897 A1 | 7/2013 | Holz |
| 2013/0187952 A1 | 7/2013 | Berkovich et al. |
| 2013/0191911 A1 | 7/2013 | Dellinger et al. |
| 2013/0194304 A1* | 8/2013 | Latta ............... G09G 3/003 345/633 |
| 2013/0204457 A1 | 8/2013 | King et al. |
| 2013/0208948 A1 | 8/2013 | Berkovich et al. |
| 2013/0222308 A1 | 8/2013 | Ma et al. |
| 2013/0222640 A1 | 8/2013 | Baek et al. |
| 2013/0239059 A1 | 9/2013 | Chen et al. |
| 2013/0241832 A1 | 9/2013 | Rimon et al. |
| 2013/0249787 A1 | 9/2013 | Morimoto |
| 2013/0252691 A1 | 9/2013 | Alexopoulos |
| 2013/0257736 A1 | 10/2013 | Hou et al. |
| 2013/0258140 A1 | 10/2013 | Lipson et al. |
| 2013/0261871 A1* | 10/2013 | Hobbs ............... G06V 40/28 701/1 |
| 2013/0271370 A1 | 10/2013 | Wang et al. |
| 2013/0271397 A1 | 10/2013 | Macdougall et al. |
| 2013/0278631 A1 | 10/2013 | Border et al. |
| 2013/0293688 A1 | 11/2013 | Benson et al. |
| 2013/0293723 A1 | 11/2013 | Benson et al. |
| 2013/0300637 A1 | 11/2013 | Smits et al. |
| 2013/0300831 A1 | 11/2013 | Mavromatis et al. |
| 2013/0307856 A1 | 11/2013 | Keane et al. |
| 2013/0307935 A1 | 11/2013 | Rappel et al. |
| 2013/0321261 A1 | 12/2013 | Nakasu et al. |
| 2013/0321265 A1 | 12/2013 | Bychkov et al. |
| 2013/0328867 A1 | 12/2013 | Jung et al. |
| 2013/0328928 A1 | 12/2013 | Yamagishi et al. |
| 2013/0335301 A1 | 12/2013 | Wong et al. |
| 2013/0335573 A1 | 12/2013 | Forutanpour et al. |
| 2014/0002365 A1 | 1/2014 | Ackley et al. |
| 2014/0010441 A1 | 1/2014 | Shamaie |
| 2014/0015831 A1 | 1/2014 | Kim et al. |
| 2014/0023247 A1 | 1/2014 | Kuwahara et al. |
| 2014/0063055 A1 | 3/2014 | Osterhout et al. |
| 2014/0064566 A1 | 3/2014 | Shreve et al. |
| 2014/0081521 A1 | 3/2014 | Frojdh et al. |
| 2014/0085203 A1 | 3/2014 | Kobayashi |
| 2014/0095119 A1 | 4/2014 | Lee et al. |
| 2014/0099019 A1 | 4/2014 | El Dokor |
| 2014/0125775 A1 | 5/2014 | Holz |
| 2014/0125813 A1 | 5/2014 | Holz |
| 2014/0132738 A1 | 5/2014 | Ogura et al. |
| 2014/0134733 A1 | 5/2014 | Wu et al. |
| 2014/0139425 A1 | 5/2014 | Sakai |
| 2014/0139641 A1 | 5/2014 | Holz |
| 2014/0152809 A1 | 6/2014 | Jarvis |
| 2014/0157135 A1 | 6/2014 | Lee et al. |
| 2014/0161311 A1 | 6/2014 | Kim |
| 2014/0168062 A1 | 6/2014 | Katz et al. |
| 2014/0176310 A1 | 6/2014 | Kotlicki |
| 2014/0176420 A1 | 6/2014 | Zhou et al. |
| 2014/0177913 A1 | 6/2014 | Holz |
| 2014/0189579 A1 | 7/2014 | Rimon et al. |
| 2014/0189938 A1 | 7/2014 | Redpath et al. |
| 2014/0192024 A1 | 7/2014 | Holz |
| 2014/0195988 A1 | 7/2014 | Kramer et al. |
| 2014/0201666 A1 | 7/2014 | Bedikian et al. |
| 2014/0201689 A1 | 7/2014 | Bedikian et al. |
| 2014/0210793 A1 | 7/2014 | Eriksson et al. |
| 2014/0222385 A1 | 8/2014 | Muenster et al. |
| 2014/0223385 A1 | 8/2014 | Ton et al. |
| 2014/0225826 A1 | 8/2014 | Juni |
| 2014/0225918 A1 | 8/2014 | Mittal et al. |
| 2014/0240215 A1 | 8/2014 | Tremblay et al. |
| 2014/0240225 A1 | 8/2014 | Eilat |
| 2014/0248950 A1 | 9/2014 | Tosas Bautista |
| 2014/0249961 A1 | 9/2014 | Zagel et al. |
| 2014/0253512 A1 | 9/2014 | Narikawa et al. |
| 2014/0253711 A1 | 9/2014 | Balch et al. |
| 2014/0253785 A1 | 9/2014 | Chan et al. |
| 2014/0267098 A1 | 9/2014 | Na et al. |
| 2014/0282282 A1 | 9/2014 | Holz |
| 2014/0285403 A1 | 9/2014 | Kobayashi |
| 2014/0306874 A1 | 10/2014 | Finocchio et al. |
| 2014/0306891 A1 | 10/2014 | Latta et al. |
| 2014/0307920 A1 | 10/2014 | Holz |
| 2014/0320274 A1 | 10/2014 | De Schepper et al. |
| 2014/0344762 A1 | 11/2014 | Grasset et al. |
| 2014/0361976 A1 | 12/2014 | Osman et al. |
| 2014/0364209 A1 | 12/2014 | Perry |
| 2014/0364212 A1 | 12/2014 | Osman et al. |
| 2014/0369558 A1 | 12/2014 | Holz |
| 2014/0375547 A1 | 12/2014 | Katz et al. |
| 2014/0375947 A1 | 12/2014 | Park et al. |
| 2015/0003673 A1 | 1/2015 | Fletcher |
| 2015/0009149 A1 | 1/2015 | Gharib et al. |
| 2015/0016777 A1 | 1/2015 | Abovitz et al. |
| 2015/0022447 A1 | 1/2015 | Hare et al. |
| 2015/0024368 A1 | 1/2015 | King, Jr. |
| 2015/0029091 A1 | 1/2015 | Nakashima et al. |
| 2015/0029218 A1 | 1/2015 | Williams et al. |
| 2015/0040297 A1 | 2/2015 | Vermillion |
| 2015/0054729 A1 | 2/2015 | Minnen et al. |
| 2015/0084864 A1 | 3/2015 | Geiss et al. |
| 2015/0084989 A1 | 3/2015 | Laughlin et al. |
| 2015/0092015 A1 | 4/2015 | Stafford |
| 2015/0094142 A1 | 4/2015 | Stafford |
| 2015/0097772 A1 | 4/2015 | Starner |
| 2015/0115802 A1 | 4/2015 | Kuti et al. |
| 2015/0116214 A1 | 4/2015 | Grunnet-Jepsen et al. |
| 2015/0122855 A1 | 5/2015 | Parsons et al. |
| 2015/0131859 A1 | 5/2015 | Kim et al. |
| 2015/0138070 A1 | 5/2015 | Iwatsu |
| 2015/0160348 A1 | 6/2015 | Zweigle et al. |
| 2015/0172539 A1 | 6/2015 | Neglur |
| 2015/0193669 A1 | 7/2015 | Gu et al. |
| 2015/0205358 A1 | 7/2015 | Lyren |
| 2015/0205400 A1 | 7/2015 | Hwang et al. |
| 2015/0206321 A1 | 7/2015 | Scavezze et al. |
| 2015/0227795 A1 | 8/2015 | Starner et al. |
| 2015/0234569 A1 | 8/2015 | Hess |
| 2015/0243078 A1 | 8/2015 | Watson et al. |
| 2015/0253428 A1 | 9/2015 | Holz |
| 2015/0253574 A1 | 9/2015 | Thurber |
| 2015/0258432 A1 | 9/2015 | Stafford et al. |
| 2015/0260990 A1 | 9/2015 | Ueno et al. |
| 2015/0261291 A1 | 9/2015 | Mikhailov et al. |
| 2015/0304593 A1 | 10/2015 | Sakai |
| 2015/0317831 A1 | 11/2015 | Ebstyne et al. |
| 2015/0320189 A1 | 11/2015 | Ju et al. |
| 2015/0323785 A1 | 11/2015 | Fukata et al. |
| 2015/0323795 A1 | 11/2015 | Alto et al. |
| 2015/0326762 A1 | 11/2015 | Ju et al. |
| 2015/0346701 A1 | 12/2015 | Gordon et al. |
| 2015/0351482 A1 | 12/2015 | Gendron et al. |
| 2015/0366284 A1 | 12/2015 | Dowling et al. |
| 2016/0025978 A1 | 1/2016 | Mallinson |
| 2016/0034039 A1 | 2/2016 | Maeda et al. |
| 2016/0044298 A1 | 2/2016 | Holz et al. |
| 2016/0062573 A1 | 3/2016 | Dascola et al. |
| 2016/0086046 A1 | 3/2016 | Holz et al. |
| 2016/0093105 A1 | 3/2016 | Rimon et al. |
| 2016/0154241 A1 | 6/2016 | Alhashim |
| 2021/0303079 A1 | 9/2021 | Holz |
| 2023/0205151 A1 | 6/2023 | Gordon et al. |

FOREIGN PATENT DOCUMENTS

| | | |
|---|---|---|
| CN | 201332447 Y | 10/2009 |
| CN | 101729808 A | 6/2010 |
| CN | 101930610 A | 12/2010 |
| CN | 101951474 A | 1/2011 |
| CN | 102053702 A | 5/2011 |
| CN | 201859393 U | 6/2011 |
| CN | 102184014 A | 9/2011 |
| CN | 102201121 A | 9/2011 |
| CN | 102236412 A | 11/2011 |
| CN | 102696057 A | 9/2012 |
| CN | 103090862 A | 5/2013 |
| DE | 4201934 A1 | 7/1993 |

(56) References Cited

FOREIGN PATENT DOCUMENTS

| | | |
|---|---|---|
| DE | 10326035 A1 | 1/2005 |
| DE | 102007015495 A1 | 10/2007 |
| DE | 102007015497 B4 | 1/2014 |
| EP | 0999542 A1 | 5/2000 |
| EP | 1477924 A2 | 11/2004 |
| EP | 1837665 A2 | 9/2007 |
| EP | 2369443 A2 | 9/2011 |
| GB | 2419433 A | 4/2006 |
| GB | 2453163 A | 4/2009 |
| GB | 2480140 A | 11/2011 |
| GB | 2519418 A | 4/2015 |
| JP | H02236407 A | 9/1990 |
| JP | H08261721 A | 10/1996 |
| JP | H09259278 A | 10/1997 |
| JP | 2000023038 A | 1/2000 |
| JP | 2002133400 A | 5/2002 |
| JP | 2003256814 A | 9/2003 |
| JP | 2004246252 A | 9/2004 |
| JP | 2006019526 A | 1/2006 |
| JP | 2006259829 A | 9/2006 |
| JP | 2007272596 A | 10/2007 |
| JP | 2008227569 A | 9/2008 |
| JP | 2009031939 A | 2/2009 |
| JP | 2009037594 A | 2/2009 |
| JP | 2010060548 A | 3/2010 |
| JP | 2011010258 A | 1/2011 |
| JP | 2011065652 A | 3/2011 |
| JP | 2011107681 A | 6/2011 |
| JP | 4906960 B2 | 3/2012 |
| JP | 2012527145 A | 11/2012 |
| KR | 101092909 B1 | 12/2011 |
| KR | 20130079841 A | 7/2013 |
| RU | 2422878 C1 | 6/2011 |
| TW | 200844871 A | 11/2008 |
| WO | 9426057 A1 | 11/1994 |
| WO | 2004114220 A1 | 12/2004 |
| WO | 2006020846 A2 | 2/2006 |
| WO | 2006090197 A1 | 8/2006 |
| WO | 2007137093 A2 | 11/2007 |
| WO | 20090142797 A2 | 11/2009 |
| WO | 2010007662 A1 | 1/2010 |
| WO | 2010032268 A2 | 3/2010 |
| WO | 2010076622 A1 | 7/2010 |
| WO | 2010088035 A2 | 8/2010 |
| WO | 2010138741 A1 | 12/2010 |
| WO | 2011024193 A2 | 3/2011 |
| WO | 2011036618 A2 | 3/2011 |
| WO | 2011044680 A1 | 4/2011 |
| WO | 2011045789 A1 | 4/2011 |
| WO | 2011119154 A1 | 9/2011 |
| WO | 2012027422 A2 | 3/2012 |
| WO | 2013109608 A2 | 7/2013 |
| WO | 2013109609 A2 | 7/2013 |
| WO | 2014208087 A1 | 12/2014 |
| WO | 2015026707 A1 | 2/2015 |
| WO | 2015172118 A1 | 11/2015 |

OTHER PUBLICATIONS

"Design and Implementation of Gaze Tracking Headgear for Nvidia 3D Vision"—Sunu Wibirama and Kazuhiko Hamamoto; 2013 International Conference on Information Technology and Electrical Engineering (ICITEE); Date of Conference: Oct. 7-8, 2013 (Year: 2013).*
Berman,S. and Stern,H., "Sensors for Gesture Recognition Systems," in IEEE Transactions on Systems, Man, and Cybernetics, Part C (Applications and Reviews), vol. 42, No. 3, May 2012, pp. 277-290.
Chung, et al., "Recovering LSHGCs and SHGCs from Stereo," International Journal of Computer Vision, vol. 20, No. 1/2, Oct. 1996, pp. 43-58.
Rolland, et. al., "A comparison of optical and video see-through head-mounted displays," 1994, 15 pages (ULTI 1050-5).
Wibirama et al., "Design and Implementation of Gaze Tracking Headgear for Nvidia 3D Vision" 2013 International Conference on Information Technology and Electrical Engineering (ICITEE) 2013, 4 pages.
Wikipedia, Affine Transformation, Wikimedia Foundation Inc., Nov. 16, 2021, 8 pages, original access Nov. 25, 2013<https://en.wikipedia.org/wiki/Affine_transformation>.
Wikipedia, Axis-angle Representation, Wikimedia Foundation Inc., Nov. 29, 2021, 6 pages, original access Jan. 25, 2014,<https://en.wikipedia.org/wiki/Axis%E2%80%93angle_representation>.
Wikipedia, Euclidean Group, Wikimedia Foundation Inc., Jul. 15, 2021, 7 pages, originally accessed Nov. 4, 2013, <https://en.wikipedia.org/wiki/Euclidean_group>.
Wikipedia, Rotation Group SO(3), Wikimedia Foundation Inc., Oct. 19, 2018, 15 pages, accessed Jan. 21, 2014<https://en.wikipedia.org/wiki/rotation_group_SO(3)>.
Wikipedia, Rotation Matrix, Wikimedia Foundation Inc., Jan. 3, 2022, 26 pages, original access Jan. 30, 2014, <https://en.wikipedia.org/wiki/Rotation_matrix>.
Wikipedia, Transformation Matrix, Wikimedia Foundation Inc., Dec. 29, 2021, 10 pages, original access Jan. 28, 2014,<https://en.wikipedia.org/wiki/Transformation_matrix>.
Schlattmann et al., "Markerless 4 gestures 6 DOF real-time visual tracking of the human hand with automatic initialization", 2007 [retrieved Jul. 15, 2016], Eurographics 2007, vol. 26, No. 3, 10 pages, Retrieved from the Internet: <http://cg.cs.uni-bonn.de/aigaion2root/attachments/schlattmann-2007-markerless.pdf>.
ShinodaLab, "Visuo-Tactile Projector," YouTube Video, published on May 14, 2013, retrieved from the internet: < http://www.youtube.com/watch?v=Bb0hNMxxewg> on Mar. 12, 2015, 2 pages.
Shlens, J., "A Tutorial on Principal Component Analysis," Derivation, Discussion and Singular Value Decomposition, Version 1, Mar. 25, 2013, UCSD.edu, pp. 1-16.
Solanki, Utpal V. and Nilesh H. Desai. "Hand Gesture Based Remote Control for Home Appliances: Handmote," 2011 World Congress on Information and Communication Technologies, Mumbai, (2011), p. 419-423.
Texas Instruments, "4-Channel, 12-Bit, 80-MSPS ADC," VSP5324, Revised Nov. 2012, Texas Instruments Incorporated, 55 pages.
Texas Instruments, "QVGA 3D Time-of-Flight Sensor," Product Overview: OPT 8140, Dec. 2013, Texas Instruments Incorporated, 10 pages.
Texas Instruments, "Time-of-Flight Controller (TFC)," Product Overview; OPT9220, Jan. 2014, Texas Instruments Incorporated, 43 pages.
U.S. Appl. No. 14/626,904, filed Feb. 19, 2015, Abandoned.
VCNL4020 Vishay Semiconductors. Application Note [online]. Designing VCNL4020 into an Application. Vishay Intertechnology, Inc, Doc No. 84136, Revised May 22, 2012 [retrieved Mar. 4, 2014]. Retrieved from the Internet: <www.vishay.com>. 21 pages.
VCNL4020 Vishay Semiconductors. Datasheet [online]. Vishay Intertechnology, Inc, Doc No. 83476, Rev. 1.3, Oct. 29, 2013 [retrieved Mar. 4, 2014]. Retrieved from the Internet: <www.vishay.com>. 16 pages.
Wang et al., "Tracking of Deformable Hand in Real Time as Continuous Input for Gesture-based Interaction", Jan. 28, 2007 [retrieved Jul. 15, 2016], Proceedings of the 12th International Conference on Intelligent User Interfaces, pp. 235-242. Retrieved fromthe Internet: <http://dl.acm.org/citation.cfm?id=1216338>.
Wikipedia, "Affine Transmation," Wikipedia—the Free Encyclopedia, last modified Mar. 5, 2015, retrieved from the internet: <http://en.wikipedia.org/w/index.php?title=Affine.sub.--transformation-&oldid=650023248> on Mar. 12, 2015, 8 pages.
Wikipedia, "Axis-angle Representation," Wikipedia—the Free Encyclopedia, last modified Dec. 30, 2014, retrieved from the internet: <http://en.wikipedia.org/w/index.php?title=Axis-angle_representation&oldid=640273193> on Mar. 12, 2015, 5 pages.
Wikipedia, "Euclidean Group," Wikipedia—the Free Encyclopedia, last modified Feb. 24, 2015, retrieved from the internet: <http://en.wikipedia.org/w/index.php?title=Euclidean_group&oldid=648705193> on Mar. 12, 2015, 7 pages.

(56) References Cited

OTHER PUBLICATIONS

Wikipedia, "Multilateration," Wikipedia—the Free Encyclopedia, Nov. 16, 2012, retrieved from the internet: <http://en.wikipedia.org/w/index.php?title=Multilateration&oldid=523281858> on Mar. 12, 2015, 10 pages.
Wikipedia, "Rotation Group SO(3)," Wikipedia—the Free Encyclopedia, last modified Feb. 20, 2015, retrieved from the internet: <http://en.wikipedia.org/w/index.php?title=Rotation_group_SO(3)&oldid=648012313> on Mar. 13, 2015, 17 pages.
Wikipedia, "Rotation Matrix," Wikipedia—the Free Encyclopedia, last modified Mar. 11, 2015, retrieved from the internet: <http://en.wikipedia.org/w/index.php?title=Rotation.sub.-matrix&oldid=650875954> on Mar. 12, 2015, 21 pages.
Wikipedia, "Transformation Matrix," Wikipedia—the Free Encyclopedia, last modified Mar. 5, 2015, retrieved from the internet: <http://en.wikipedia.org/w/index.php?title=Transformation.sub.--matrix- &oldid=649936175> on Mar. 12, 2015, 8 pages.
Wong, Kie Yih Edward, et. al., "Palmprint Identification Using Sobel Operator," 10th International Conference on Control, automation, Robotics and Vision, Dec. 17-20, 2008, 4 pages.
Zhao et al., "Combining Marker-Based Mocap and RGB-D Camera for Acquiring High-Fidelity Hand Motion Data", Jul. 29, 2012 [retrieved Jul. 15, 2016], Proceedings of the ACM SIGGRAPH/Eurographics Symposium on Computer Animation, pp. 33-42, Retrieved from the Internet: <http://dl.acm.org/citation.cfm?id=2422363>.
U.S. Appl. No. 14/625,635, filed Feb. 19, 2015, U.S. Pat. No. 10,782,657, Sep. 22, 2020, Granted.
U.S. Appl. No. 17/027,366, filed Sep. 21, 2020, U.S. Pat. No. 11,561,519, Jan. 24, 2023, Granted.
U.S. Appl. No. 18/093,257, filed Jan. 4, 2023, 20230205151, Jun. 29, 2023, Final Rejec.
U.S. Appl. No. 14/997,454, filed Jan. 15, 2016, U.S. Pat. No. 10,656,720, May 19, 2020, Granted.
U.S. Appl. No. 16/877,231, filed May 18, 2020, U.S. Pat. No. 11,036,304, Jun. 15, 2021, Granted.
U.S. Appl. No. 17/345,919, filed Jun. 11, 2021, U.S. Pat. No. 11,782,513, Oct. 10, 2023, Granted.
U.S. Appl. No. 18/374,588, filed Sep. 28, 2023, 20240045509, Feb. 8, 2024, Published.
"EigenSolver <_ MatrixType> Class Template Reference," Reference Eigen Values Module, retrieved from the internet: <http://eigen.luxfamily.org/dox/classEigen_1_1EigenSolver.html> on Mar. 12, 2015, pp. 1-8.
"Hessian Matrix of the Image," Matlab-Hessian Matrix of the Image-Stack Overflow, last edited Mar. 13, 2014, retrieved from the internet: <http://stackoverflow.com/questions/22378360/hessian-matrix-of-the-image> on Mar. 10, 2015, 3 pages.
"How Hessian Feature Detector Works?" Signal Processing Stack Exchange, last edited Oct. 2013, retrieved from the internet: <http://dsp.stackexchange.com/questions/10579/how0hessian-feature-detector-works> on Mar. 10, 2015, 3 pages.
"SVD Module," Reference, Eigen: SVD Module, retrieved from the internet: <http://eigen.luxfamily.org/dox/group_SVD_Module.html> on Mar. 12, 2015, 1 page.
Arthington, et al., "Cross-section Reconstruction During Uniaxial Loading," Measurement Science and Technology, vol. 20, No. 7, Jun. 10, 2009, Retrieved from the Internet: http:iopscience.iop.org/0957-0233/20/7/075701, pp. 1-9.
Ballan et al., "Lecture Notes Computer Science: 12th European Conference on Computer Vision: Motion Capture of Hands in Action Using Discriminative Salient Points", Oct. 7-13, 2012 [retrieved Jul. 14, 2016], Springer Berlin Heidelberg, vol. 7577, pp. 640-653. Retrieved from the Internet: <http://link.springer.com/chapter/10.1007/978-3-642-33783-3 46>.
Barat et al., "Feature Correspondences From Multiple Views of Coplanar Ellipses", 2nd International Symposium on Visual Computing, Author Manuscript, 2006, 10 pages.
Bardinet, et al., "Fitting of iso-Surfaces Using Superquadrics and Free-Form Deformations" [on-line], Jun. 24-25, 1994 [retrieved Jan. 9, 2014], 1994 Proceedings of IEEE Workshop on Biomedical Image Analysis, Retrieved from the Internet: http://ieeexplore.ieee.org/xpls/abs_all.jsp?arnumber=315882&tag=1, pp. 184-193.
Bhutami, R., "What are the Ways of Calculating 2x2 Hessian Matrix for 2D Image of Pixel at (x,y) Position?," Quora, last updated May 2013, retrieved from the internet: <http://www.quora.com/What-are-the-ways-of-calculating-2-x-2-hessian-m-atrix-for-2d-image-of-pixel-at-x-y-position> on Mar. 10, 2015, 4 pages.
Butail, S., et al., "Three-Dimensional Reconstruction of the Fast-Start Swimming Kinematics of Densely Schooling Fish," Journal of the Royal Society Interface, Jun. 3, 2011, retrieved from the Internet <http://www.ncbi.nlm.nih.gov/pubmed/21642367>, pp. 0, 1-12.
Cheikh et al., "Multipeople Tracking Across Multiple Cameras", International Journal on New Computer Architectures and Their Applications (IJNCAA), vol. 2, No. 1, 2012, pp. 23-33.
Choras, M., et al., "Contactless Palmprint and Knuckle Biometrics for Mobile Devices", Springerlink, Dec. 8, 2009, 13 pages.
Chung, et al., "International Journal of Computer Vision: RecoveringLSHGCs and SHGCs from Stereo" [on-line], Oct. 1996 [retrieved on Apr. 10, 2014], Kluwer Academic Publishers, vol. 20, issue 1-2, Retrieved from the Internet: http://link.springer.com/article/10.1007/BF00144116#, pp. 43-58.
Cui et al., "Applications of Evolutionary Computing: Vision-Based Hand Motion Capture Using Genetic Algorithm", 2004 [retrieved Jul. 15, 2016], Springer Berlin Heidelberg, vol. 3005 of LNCS, pp. 289-300. Retrieved from the Internet: <http://link.springer.eom/chapter/10.1007/978-3-540-24653-4_30>.
Cumani, A., et al., "Recovering the 3D Structure of Tubular Objects from Stereo Silhouettes," Pattern Recognition, Elsevier, GB, vol. 30, No. 7, Jul. 1, 1997, 9 pages.
Davis et al., "Toward 3-D Gesture Recognition", International Journal of Pattern Recognition and Artificial Intelligence, vol. 13, No. 03, 1999, pp. 381-393.
Delamarre et al., "Finding Pose of Hand in Video Images: A Stereo-based Approach", Apr. 14-16, 1998 [retrieved Jul. 15, 2016], Third IEEE Intern Conf on Auto Face and Gesture Recog, pp. 585-590. Retrieved from the Internet: <http://ieeexplore.ieee.org/xpl/login.jsp?tp=&arnumber=671011&url=http%3A%2F%2Fieeexplore.ieee.org%2Fxpls%2Fabs_all.jsp%3Farnumber%3D671011>.
Di Zenzo, S., et al., "Advances in Image Segmentation," Image and Vision Computing, Elsevier, Guildford, GBN, vol. 1, No. 1, Copyright Butterworth & Co Ltd., Nov. 1, 1983, pp. 196-210.
Dombeck, D., et al., "Optical Recording of Action Potentials with Second-Harmonic Generation Microscopy," The Journal of Neuroscience, Jan. 28, 2004, vol. 24(4): pp. 999-1003.
Forbes, K., et al., "Using Silhouette Consistency Constraints to Build 3D Models," University of Cape Town, Copyright De Beers 2003, Retrieved from the internet: <http://www.dip.ee.uct.ac.za/kforbes/Publications/Forbes2003Prasa.pdf> on Jun. 17, 2013, 6 pages.
Franco, Michael. "Wave Your Hand to Control Smart Devices—Even if it's Out of Sight." Cnet (Feb. 28, 2014).
Fukui et al. "Multiple Object Tracking System with Three Level Continuous Processes" IEEE, 1992, pp. 19-27.
Genovese, Angelo, Contactless and less Constrained Palmprint Recognition, Mar. 18, 2014, 48 pages.
Gorce et al., "Model-Based 3D Hand Pose Estimation from Monocular Video", Feb. 24, 2011 [retrieved Jul. 15, 2016], IEEE Transac Pattern Analysis and Machine Intell, vol. 33, Issue: 9, pp. 1793-1805, Retri Internet: <http://ieeexplore.ieee.org/xpl/logi n .jsp ?tp=&arnu mber=571 9617 &u rl=http%3A %2 F%2 Fieeexplore.ieee.org%2Fxpls%2 Fabs all.isp%3Farnumber%3D5719617>.
Grauman, K., et al., "Chapter 3—Local Features: Detection and Description," Visual Object Recognition: Synthesis Lectures on Artificial Intelligence and Machine Learning, Apr. 2011, retrieved from the internet:<www.morganclaypool.com/doi/abs/10.2200/S00332Ed1V01Y201103A- M011> on Mar. 12, 2015, pp. 1, 23-39.
Guo et al., Featured Wand for 3D Interaction, Jul. 2-5, 2007 [retrieved Jul. 15, 2016], 2007 IEEE International Conference on Multimedia and Expo, pp. 2230-2233. Retrieved from the Internet: <http://ieeexplore.ieee.org/xpl/login.isp?tp=&arnumber=4285129

(56) References Cited

OTHER PUBLICATIONS

&tag=1&url=http%3A%2F%2Fieeexplore.ieee.org%2Fxpls%2Fabs_all.jsp%3Farnumber%3D4285129%26tag%3D1>.

Heikkila, J., "Accurate Camera Calibration and Feature Based 3-D Reconstruction from Monocular Image Sequences", Infotech Oulu and Department of Electrical Engineering, University of Oulu, 1997, 126 pages.

Hladuvka, J., et al., "Exploiting Eigenvalues of the Hessian Matrix for Volume Decimation," CiteSeerx, Copyright 2001, retrieved from the internet: <http://citeseerx.isf.psu.edu/viewdoc/summary?doi=10.1.1.67.- 565> on Mar. 12, 2015, fromVienna University of Technology, 7 pages.

Interactive Gaming Smart Vending Machine. Silikron Smart Vending, URL: https:///www.youtube.com/watch?v=tK17sXvzLtU, Dec. 12, 2013.

Jin et al., Vascular Tree Segmentation in Medical Images Using Hessian-Based Multiscale Filtering and Level Set Method, Hindawi, dated Jun. 28, 2013, 8 pages.

Kanhangad, V., et al, "Combining 2D and 3D Hand Geometry Features for Biometric Verification", IEEE 2009, 6 pages.

Kanhangad, V., et al., "A Unified Framework for Contactless Hand Verification," IEEE Transactions on Information Forensics and Security, IEEE, Piscataway, NJ, US , vol. 6, No. 3, Sep. 1, 2011, pp. 1014-1027.

Kellogg, Bryce, Vamsi Talla, and Shyamnath Gollakota. "Bringing Gesture Recognition to All Devices," NSDI'14: Proceedings of the 11th USENIX Conference on Networked Systems Design and Implementation, (Apr. 2, 2014), pp. 303-316. (Year: 2014).

Kim, et al., "Development of an Orthogonal Double-Image Processing Algorithm to Measure Bubble," Department of Nuclear Engineering and Technology, Seoul National University Korea, vol. 39 No. 4, Published Jul. 6, 2007, pp. 313-326.

Korida, et al., "An Interactive 3D Interface for a Virtual Ceramic Art Work Environment", published on Virtual Systems and MultiMedia, 1997. VSMM '97. Proceedings., International Conference (Sep. 10, 1997), 8 pages.

Kulesza, et al., "Arrangement of a Multi Stereo Visual Sensor System for a Human Activities Space," Source: Stereo Vision, Book edited by: Dr. Asim Bhatti, ISBN 978-953-7619-22-0, Copyright Nov. 2008, I-Tech, Vienna, Austria, www.intechopen.com, pp. 153-173.

Lo et al., "Augmediated reality system based on 3D camera selfgesture sensing," IEEE International Symposium on Technology and Society (ISTAS) 2013, 12 pages.

Matsuyama et al. "Real-Time Dynamic 3-D Object Shape Reconstruction and High-Fidelity Texture Mapping for 3-D Video," IEEE Transactions on Circuits and Systems for Video Technology, vol. 14, No. 3, Mar. 2004, pp. 357-369.

May, S., et al., "Robust 3D-Mapping with Time-of-Flight Cameras," 2009 IEEE/RSJ International Conference on Intelligent Robots and Systems, Piscataway, NJ, USA, Oct. 10, 2009, pp. 1673-1678.

Melax et al., "Dynamics Based 3D Skeletal Hand Tracking", May 29, 2013 [retrieved Jul. 14, 2016], Proceedings of Graphics Interface, 2013, pp. 63-70. Retrived from the Internet: <http://dl.acm.org/citation.cfm?id=2532141>.

Mendez, et al., "Importance Masks for Revealing Occluded Objects in Augmented Reality," Proceedings of the 16th ACM Symposium on Virtual Reality Software and Technology, 2 pages, ACM, 2009.

Oka et al., "Real-Time Fingertip Tracking and Gesture Recognition", Nov./Dec. 2002 [retrieved Jul. 15, 2016], IEEE Computer Graphics and Applications, vol. 22, Issue: 6, pp. 64-71. Retrieved from the Internet: <http://ieeexplore.ieee.org/xpl/login.jsp?tp=&arumber=1046630&ur/=http%3A%2F%2Fieeexplore.ieee.org%2Fxpls%2Fabsall.jsp%3Farnumber%3D1046630>.

Olsson, K., et al., "Shape from Silhouette Scanner—Creating a Digital 3D Model of a Real Object by Analyzing Photos From Multiple Views," University of Linkoping, Sweden, Copyright VCG 2001, Retrieved from the Internet: <http://liu.diva-portal.org/smash/get/diva2:18671/FULLTEXT01> on Jun. 17, 2013, 52 pages.

Pedersini, et al., Accurate Surface Reconstruction from Apparent Contours, Sep. 5-8, 2000 European Signal Processing Conference EUSIPCO 2000, vol. 4, Retrieved from the Internet: http://home.deib.polimi.it/sarti/CV_and_publications.html, pp. 1-4.

Pointgrab LTD. "New Line of Acer All-in-One Devices Among the First Products to Feature PointGrab's Windows 8 Hand Gesture Control Solution," Business Wire (English), (Nov. 13, 2012).

Rasmussen, Matihew K., "An Analytical Framework for the Preparation and Animation of a Virtual Mannequin forthe Purpose of Mannequin-Clothing Interaction Modeling", A Thesis Submitted in Partial Fulfillment of the Requirements for the Master of Science Degree in Civil and Environmental Engineering in the Graduate College of the University of Iowa, Dec. 2008, 98 pages.

Rudzki, M., "Vessel Detection Method Based on Eigenvalues of Hessian Matrix and its Applicability to Airway Tree Segmentation," XI International PhD Workshop, OWD 2009, Silesian University of Technology, Oct. 17-20, 2009, 6 pages.

Schaar, R., VCNL4020 Vishay Semiconductors. Application Note [online]. Extended Detection Range with VCNL Family of Proximity Sensor Vishay Intertechnology, Inc, Doc No. 84225, Revised Oct. 25, 2013 [retrieved Mar. 4, 2014]. Retrieved from the Internet: <www.vishay.com>. 4 pages.

\* cited by examiner

AUGMENTED REALITY WITH MOTION SENSING

CROSS-REFERENCE TO OTHER APPLICATIONS

This application is a continuation of U.S. patent application Ser. No. 17/972,288, entitled "AUGMENTED REALITY WITH MOTION SENSING", filed Oct. 24, 2022, which is a continuation of U.S. patent application Ser. No. 17/133,616, entitled "AUGMENTED REALITY WITH MOTION SENSING", filed Dec. 23, 2020, which is a continuation of U.S. patent application Ser. No. 16/505,265, entitled "AUGMENTED REALITY WITH MOTION SENSING", filed Jul. 8, 2019, which is a continuation of U.S. patent application Ser. No. 14/821,499, entitled "AUGMENTED REALITY WITH MOTION SENSING", filed Aug. 7, 2015, which claims the benefit of U.S. Provisional Patent Application No. 62/035,008, entitled "AUGMENTED REALITY WITH MOTION SENSING," filed 8 Aug. 2014, which are both hereby incorporated by reference for all purposes.

TECHNICAL FIELD

The technology disclosed relates to highly functional/highly accurate sensory and imaging device for use in wearable sensor systems capable of detecting gestures in a three dimensional (3D) sensory space using imaging or other sensors and presenting a 3D augmented reality to a user.

BACKGROUND

One class of devices, such as Google Glass, provides the capability to present information superimposed on a see through screen worn by a user. Another type of device, such as Oculus Rift, provides a virtual reality display to the user devoid of information from the real world surrounding the user. Both of these types of devices fail, however, to adequately provide for integration of virtual (e.g., computational) information into a real time image stream that reflects the environment surrounding the wearer. A need therefore exists for highly functional sensory and imaging device capable of acquiring imaging information of the scene and providing at least a near real time pass-through of imaging information to a user. The sensory and imaging device ideally could be coupled to a wearable or portable device to create a wearable sensory system capable of presenting to the wearer the imaging information augmented with virtualized or created presentations of information. No devices heretofore known provide these capabilities.

SUMMARY

Implementations of the technology disclosed address these and other problems by providing motion sensory and imaging device capable of acquiring imaging information of the scene and providing at least a near real time pass-through of imaging information to a user. The sensory and imaging device can be used stand-alone or coupled to a wearable or portable device to create a wearable sensory system capable of presenting to the wearer the imaging information augmented with virtualized or created presentations of information.

One implementation of a motion sensory and imaging device includes a plurality of imaging sensors arranged to provide stereoscopic imaging information for a scene being viewed; one or more illumination sources arranged about the imaging sensors; and a controller coupled to the imaging sensors and illumination sources to control operation thereof. The controller enables the device to acquire imaging information of the scene, and provide at least a near real time pass-through of imaging information to a user. The device can be coupled to a wearable device to create a wearable sensory systems capable of presenting to the wearer the imaging information augmented with virtualized or created presentations of information.

In one implementation, a motion sensory and imaging device further captures imaging information for control objects—including control objects such as human hands—within the viewpoint of the imaging sensors. The imaging information for control objects of interest can be used to determine gesture information indicating a command to a machine under control. In implementations, the device enables detecting positions, poses and motions of objects surrounding the wearer of the device with sub-millimeter accuracy and providing this information for integration into the presentation provided to the wearer.

In one implementation, a motion sensory and imaging device includes capabilities to separate information received from pixels sensitive to IR light from information received from pixels sensitive to visible light, e.g., RGB (red, green, and blue) and processing image information from IR (infrared) sensors to be used for gesture recognition and image information from RGB sensors to be provided as a live video feed via a presentation interface. For example, a video stream including a sequence of images of a scene in the real world is captured using cameras having a set of RGB pixels and a set of IR pixels. Information from the IR sensitive pixels is separated out for processing to recognize gestures. Information from the RGB sensitive pixels is provided to a presentation interface of a wearable device (HUD, HMD, etc.) as a live video feed to a presentation output. The presentation output is displayed to a user of the wearable device. One or more virtual objects can be integrated with the video stream images to form the presentation output. Accordingly, the device is enabled to provide any of gesture recognition, a real world presentation of real world objects via pass through video feed, and/or an augmented reality including virtual objects integrated with a real world view.

In one implementation, a motion sensory and imaging device can be used for tracking motion of the device itself using a combination a RGB and IR pixels of the cameras. In particular, it relates to capturing gross or coarse features and corresponding feature values of a real world space using RGB pixels and capturing fine or precise features and corresponding feature values of the real world space using IR pixels. Once captured, motion information of the wearable sensor system with respect to at least one feature of the scene is determined based on comparison between feature values detected at different time instances. For instance, a feature of a real world space is an object at a given position in the real world space, and then the feature value can be the three-dimensional (3D) co-ordinates of the position of the object in the real world space. If, between pairs of image frame or other image volume, the value of the position co-ordinates changes, then this can be used to determine motion information of the wearable sensory system with respect to the object whose position changed between image frames.

In another example, a feature of a real world space is a wall in the real world space and the corresponding feature value is orientation of the wall as perceived by a viewer engaged with a wearable sensor system. In this example, if a change in the orientation of the wall is registered between successive image frames captured by a camera electronically coupled to the wearable sensor system, then this can indicate a change in the position of the wearable sensor system that views the wall.

According to one implementation, information from RGB pixels of a camera can be used to identify an object in the real world space along with prominent or gross features of the object from an image or sequence of images such as object contour, shape, volumetric model, skeletal model, silhouettes, overall arrangement and/or structure of objects in a real world space. This can be achieved by measuring an average pixel intensity of a region or varying textures of regions. Thus, RGB pixels allow for acquisition of a coarse estimate of the real world space and/or objects in the real world space.

Further, data from the IR pixels can be used to capture fine or precise features of the real world space, which enhance the data extracted from RGB pixels. Examples of fine features include surface textures, edges, curvatures, and other faint features of the real world space and objects in the real world space. In one example, while RGB pixels capture a solid model of a hand, IR pixels are used capture the vein and/or artery patterns or fingerprints of the hand.

Some other implementations can include capturing image data by using the RGB and IR pixels in different combinations and permutations. For example, one implementation can include simultaneously activating the RGB and IR pixels to perform a whole scale acquisition of image data, without distinguishing between coarse or detail features. Another implementation can include using the RGB and IR pixels intermittently. Yet another implementation can include activating the RGB and IR pixels according to a quadratic or Gaussian function. Some other implementations can include performing a first scan using the IR pixels followed by an RGB scan, and vice-versa.

In one implementation, the ambient lighting conditions are determined and can be used to adjust display of output. For example, information from the set of RGB pixels is displayed in normal lighting conditions and information from the set of IR pixels in dark lighting conditions. Alternatively, or additionally, information from the set of IR pixels can be used to enhance the information from the set of RGB pixels for low-light conditions, or vice versa. Some implementations will receive from a user a selection indicating a preferred display chosen from one of color imagery from the RGB pixels and IR imagery from the IR pixels, or combinations thereof. Alternatively, or additionally, the device itself may dynamically switch between video information captured using RGB sensitive pixels and video information captured using IR sensitive pixels for display depending upon ambient conditions, user preferences, situational awareness, other factors, or combinations thereof.

In one implementation, information from the IR sensitive pixels is separated out for processing to recognize gestures; while the information from the RGB sensitive pixels is provided to an output as a live video feed; thereby enabling conserving bandwidth to the gesture recognition processing. In gesture processing, features in the images corresponding to objects in the real world can be detected. The features of the objects are correlated across multiple images to determine change, which can be correlated to gesture motions. The gesture motions can be used to determine command information to a machine under control, application resident thereon or combinations thereof.

In one implementation, motion sensors and/or other types of sensors are coupled to a motion-capture system to monitor motion of at least the sensor of the motion-capture system resulting from, for example, users' touch. Information from the motion sensors can be used to determine first and second positional information of the sensor with respect to a fixed point at first and second times. Difference information between the first and second positional information is determined. Movement information for the sensor with respect to the fixed point is computed based upon the difference information. The movement information for the sensor is applied to apparent environment information sensed by the sensor to remove motion of the sensor therefrom to yield actual environment information; which can be communicated. Control information can be communicated to a system configured to provide a virtual reality or augmented reality experience via a portable device and/or to systems controlling machinery or the like based upon motion capture information for an object moving in space derived from the sensor and adjusted to remove motion of the sensor itself. In some applications, a virtual device experience can be augmented by the addition of haptic, audio and/or visual projectors.

In an implementation, apparent environmental information is captured from positional information of an object portion at the first time and the second time using a sensor of the motion-capture system. Object portion movement information relative to the fixed point at the first time and the second time is computed based upon the difference information and the movement information for the sensor.

In further implementations, a path of the object is calculated by repeatedly determining movement information for the sensor, using the motion sensors, and the object portion, using the sensor, at successive times and analyzing a sequence of movement information to determine a path of the object portion with respect to the fixed point. Paths can be compared to templates to identify trajectories. Trajectories of body parts can be identified as gestures. Gestures can indicate command information to be communicated to a system. Some gestures communicate commands to change operational modes of a system (e.g., zoom in, zoom out, pan, show more detail, next display page, and so forth).

Advantageously, some implementations can enable improved user experience, greater safety and improved functionality for users of wearable devices. Some implementations further provide capability to motion capture systems to recognize gestures, allowing the user to execute intuitive gestures involving virtualized contact with a virtual object. For example, a device can be provided a capability to distinguish motion of objects from motions of the device itself in order to facilitate proper gesture recognition. Some implementations can provide improved interfacing with a variety of portable or wearable machines (e.g., smart telephones, portable computing systems, including laptop, tablet computing devices, personal data assistants, special purpose visualization computing machinery, including heads up displays (HUD) for use in aircraft or automobiles for example, wearable virtual and/or augmented reality systems, including Google Glass, and others, graphics processors, embedded microcontrollers, gaming consoles, or the like; wired or wirelessly coupled networks of one or more of the foregoing, and/or combinations thereof), obviating or reducing the need for contact-based input devices such as a mouse, joystick, touch pad, or touch screen. Some implementations can provide for improved interface with computing and/or other machinery than would be possible with heretofore known techniques. In some implementations, a richer human—machine interface experience can be provided.

DESCRIPTION

Figure 1:
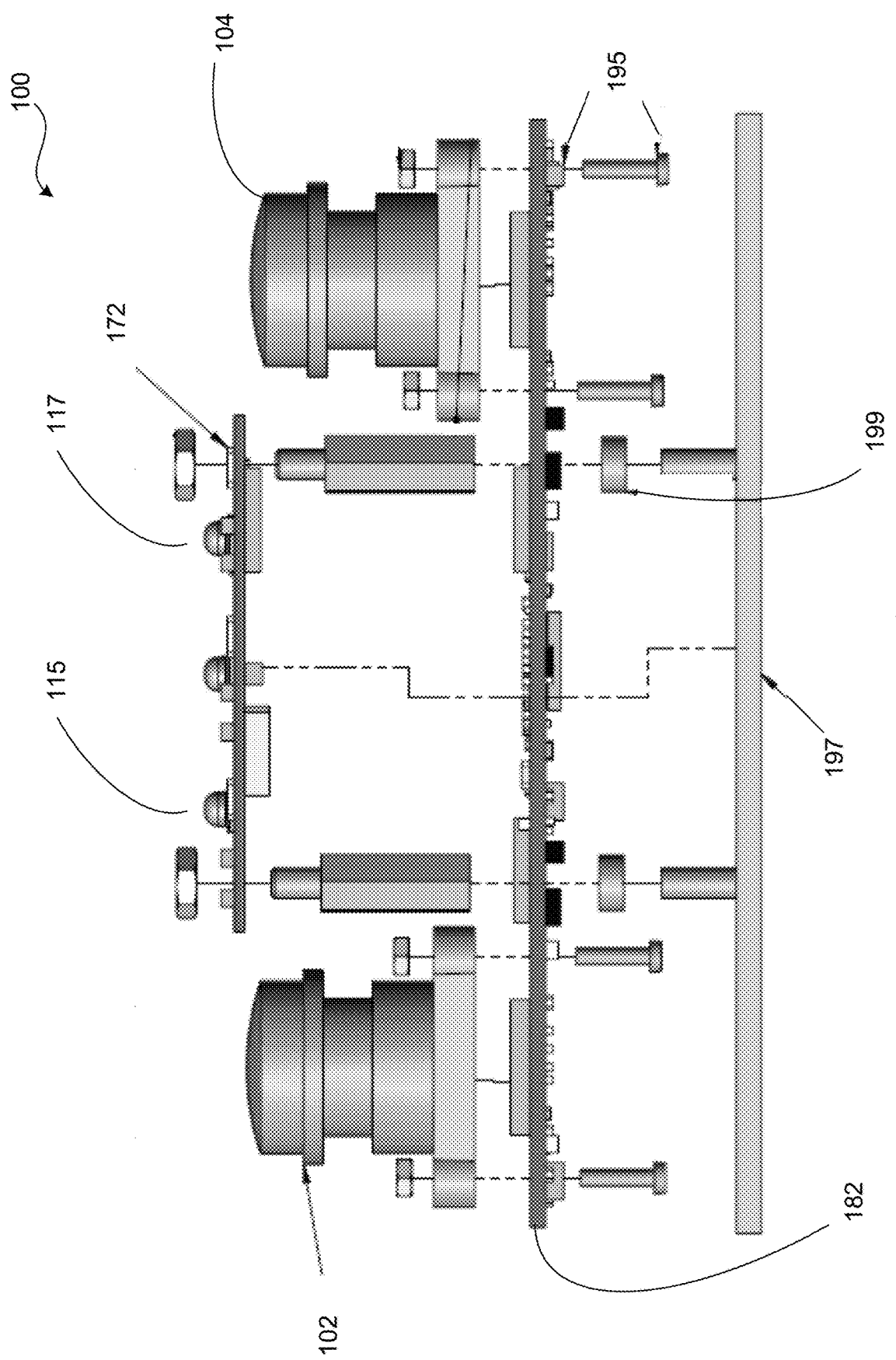
FIG. 1 shows an example motion sensory and imaging device.

The technology disclosed relates to a motion sensory and imaging devices capable of capturing real or near real time images of a scene, detecting a gesture in 3D sensory space and interpreting the gesture as a command to a system or machine under control, and providing the captured image information and the command when appropriate.

Implementations include providing a "pass-through" in which live video is provided to the user of the virtual reality device, either alone or in conjunction with display of one or more virtual objects, enabling the user to perceive the real world directly. For example, the user is enabled to see an actual desk environment as well as virtual applications or objects intermingled therewith. Gesture recognition and sensing enables implementations to provide the user with the ability to grasp or interact with objects real (e.g., the user's coke can) alongside the virtual (e.g., a virtual document floating above the surface of the user's actual desk. In some implementations, information from differing spectral sources is selectively used to drive one or another aspect of the experience. For example, information from IR sensitive sensors can be used to detect the user's hand motions and recognize gestures. While information from the visible light region can be used to drive the pass through video presentation, creating a real world presentation of real and virtual objects. In a further example, combinations of image information from multiple sources can be used; the system—or the user—selecting between IR imagery and visible light imagery based upon situational, conditional, environmental or other factors or combinations thereof. For example, the device can switch from visible light imaging to IR imaging when the ambient light conditions warrant. The user can have the ability to control the imaging source as well. In yet further examples, information from one type of sensor can be used to augment, correct, or corroborate information from another type of sensor. Information from IR sensors can be used to correct the display of imaging conducted from visible light sensitive sensors, and vice versa. In low-light or other situations not conducive to optical imaging, where free-form gestures cannot be recognized optically with a sufficient degree of reliability, audio signals or vibrational waves can be detected and used to supply the direction and location of the object as further described herein.

The technology disclosed can be applied to enhance user experience in immersive virtual reality environments using wearable sensor systems. Examples of systems, apparatus, and methods according to the disclosed implementations are described in a "wearable sensor systems" context. The examples of "wearable sensor systems" are being provided solely to add context and aid in the understanding of the disclosed implementations. In other instances, examples of gesture-based interactions in other contexts like automobiles, robots, or other machines can be applied to virtual games, virtual applications, virtual programs, virtual operating systems, etc. Other applications are possible, such that the following examples should not be taken as definitive or limiting either in scope, context, or setting. It will thus be apparent to one skilled in the art that implementations can be practiced in or outside the "wearable sensor systems" context.

Refer first to FIG. 1, which shows an example motion sensory device 100 that includes an illumination board 172 coupleable to a main board 182 with threaded fasteners or otherwise. Cabling (not shown in FIG. 1 for clarity's sake) makes electrical interconnection between illumination board 172 and main board 182 permitting exchange of signals and power flow. The fasteners 199 that fasten the main board 182 (first portion) and the illumination board 172 (second portion) can further fasten these portions to a mounting surface 197 of a wearable or portable electronic device (e.g., an HMD, HUD, smartphone, or the like). The mounting surface 197 can be a surface (internal or external) of a wearable or portable electronic device. Alternatively, the device can be disposed within a cavity or receptacle of wearable or portable electronic device using a friction fit, fasteners or any combination thereof. Device 100 can be embedded in any of a variety of a wearable or portable electronic device to meet design requirements of a wide variety of applications.

The illumination board 172 has a number of individually controllable illumination sources 115, 117, which can be LEDs for example, embedded thereon. Two cameras 102, 104 provide stereoscopic image-based sensing of a scene being viewed and reside on the main board 182 of device 100 in the illustrated implementation. One or more fasteners 195 that fasten the imaging sensors and the illumination sources to one of a mounting surface 197 in a wearable presentation device, a cavity in a wearable presentation device, a mounting surface 197 in a portable presentation device, and a cavity in a portable presentation device. The main board 182 may also include a processor for basic image processing, control of the cameras 102, 104 and the LEDs of board 172. Various modifications of the design shown in FIG. 1 are possible; for example, the number and arrangement of LEDs, photo-detectors, and cameras may vary, the scanning and imaging hardware may be integrated on a single board, or both depending upon the requirements of a particular application.

Stereoscopic imaging information provided by cameras 102, 104 is provided selectively or continuously to a user wearing or carrying the wearable or portable electronic device. The device 100 can provide live "real time" or near real time feed of image information from the cameras, real time or near real time imaging information augmented by computer generated graphics, information, icons or other virtualized presentations, virtualized representations of the scene being viewed, time varying combinations selected therefrom. Gestures made by a user can be sensed by the cameras 102, 104 of the sensory device 100, as well, and the resulting imaging information can be provided to a motion capture system to identify and determine commands to any system (including the wearable or portable device itself) under control from the gestures. Advantageously, integrating gesture recognition with imaging capabilities into a single motion sensory device 100 provides a highly functional, flexible, yet compact device suited to installation in wearable or portable electronic devices, and so forth.

Some of the illumination sources 115, 117 can have associated focusing optics (not shown by FIG. 1 for clarity sake) in some implementations. Either board 172 or 182 may also include a socket(s) for coupling photo-detector(s) (or other sensors) not shown by FIG. 1 for clarity sake. Information from a photo-detector sensing changes in reflectance indicating presence or absence of objects within a region of space into which the illumination sources emit light during a "scanning" of the region of space by the illumination sources, e.g., LEDs.

Figure 2:
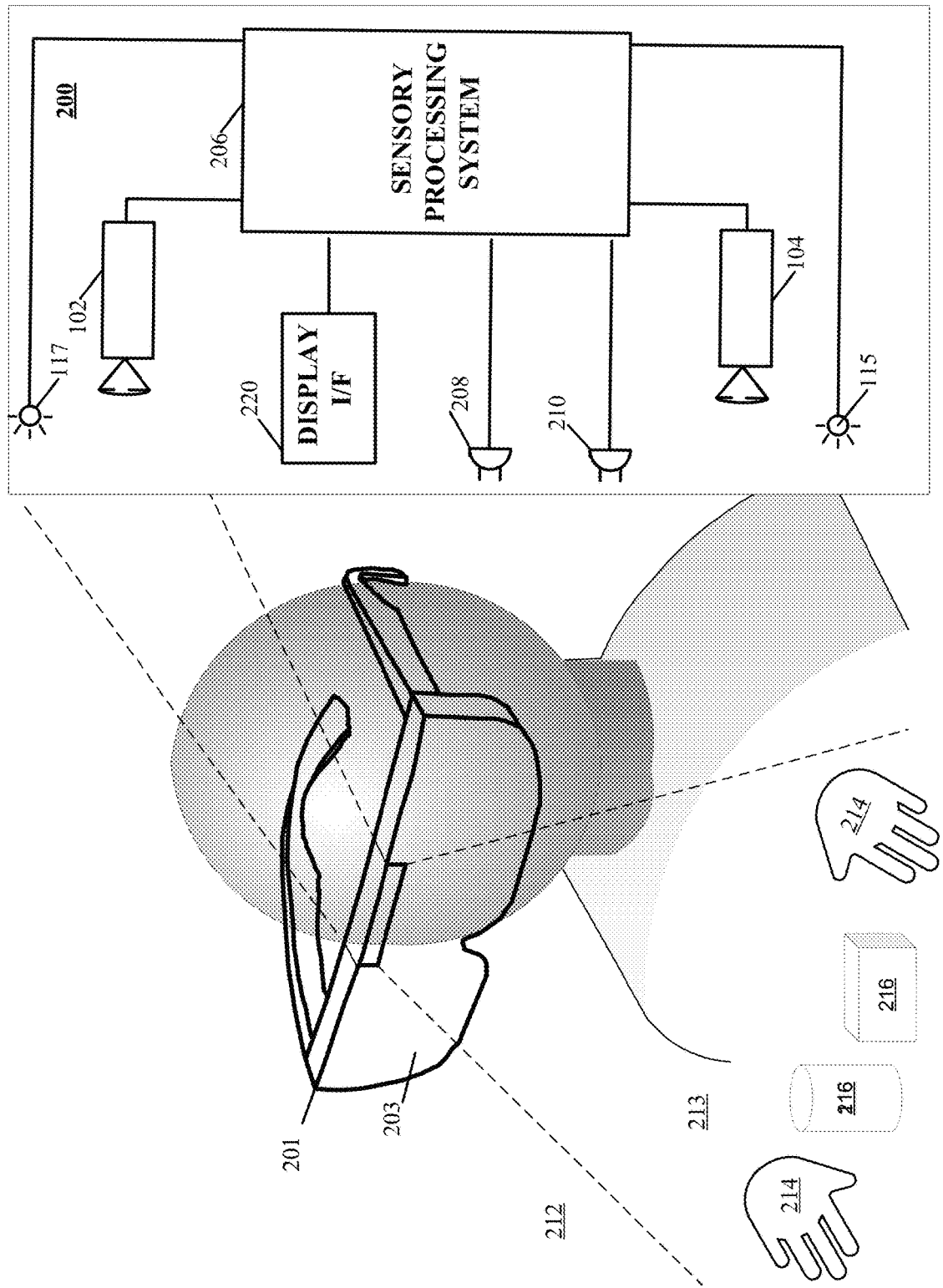
FIG. 2 shows an example wearable sensory system based upon a motion sensory and imaging device.

Now with reference to FIG. 2, which illustrates a system 200 for capturing image data according to one implementation of the technology disclosed. System 200 is preferably coupled to a wearable device 201 that can be a personal head mounted display (HMD) having a goggle form factor such as shown in FIG. 2, a helmet form factor, or can be incorporated into or coupled with a watch, smartphone, or other type of portable device, forming a wearable sensory system.

In various implementations, the system and method for capturing 3D motion of an object as described herein can be integrated with other applications, such as a head-mounted device or a mobile device. Referring again to FIG. 2, a head-mounted device 201 can include an optical assembly 203 that displays a surrounding environment or a virtual environment to the user; incorporation of the motion-capture system 200 in the head-mounted device 201 allows the user to interactively control the displayed environment. For example, a virtual environment can include virtual objects that can be manipulated by the user's hand gestures, which are tracked by the motion-capture system 200. In one implementation, the motion-capture system 200 integrated with the head-mounted device 201 detects a position and shape of user's hand and projects it on the display of the head-mounted device 201 such that the user can see her gestures and interactively control the objects in the virtual environment. This can be applied in, for example, gaming or internet browsing.

System 200 includes some cameras 102, 104 coupled to sensory processing system 206. Cameras 102, 104 can be any type of camera, including cameras sensitive across the visible spectrum or with enhanced sensitivity to a confined wavelength band (e.g., the infrared (IR) or ultraviolet bands); more generally, the term "camera" herein refers to any device (or combination of devices) capable of capturing an image of an object and representing that image in the form of digital data. For example, line sensors or line cameras rather than conventional devices that capture a two-dimensional (2D) image can be employed. The term "light" is used generally to connote any electromagnetic radiation, which may or may not be within the visible spectrum, and may be broadband (e.g., white light) or narrowband (e.g., a single wavelength or narrow band of wavelengths).

Cameras 102, 104 are preferably capable of capturing video images (i.e., successive image frames at a substantially constant rate of about 15 frames per second or so); although no particular frame rate is required. The capabilities of cameras 102, 104 are not critical to the technology disclosed, and the cameras can vary as to frame rate, image resolution (e.g., pixels per image), color or intensity resolution (e.g., number of bits of intensity data per pixel), focal length of lenses, depth of field, etc. In general, for a particular application, any cameras capable of focusing on objects within a spatial volume of interest can be used. For instance, to capture motion of the hand of an otherwise stationary person, the volume of interest might be defined as a cube approximately one meter on a side.

As shown, cameras 102, 104 can be oriented toward portions of a region of interest 212 by motion of the device 201, in order to view a virtually rendered or virtually augmented view of the region of interest 212 that can include a variety of virtual objects 216 as well as contain an object of interest 214 (in this example, one or more hands) that moves within the region of interest 212. One or more sensors 208, 210 capture motions of the device 201. In some implementations, one or more light sources 115, 117 are arranged to illuminate the region of interest 212. In some implementations, one or more of the cameras 102, 104 are disposed opposite the motion to be detected, e.g., where the hand 214 is expected to move. This is an optimal location because the amount of information recorded about the hand is proportional to the number of pixels it occupies in the camera images, and the hand will occupy more pixels when the camera's angle with respect to the hand's "pointing direction" is as close to perpendicular as possible. Sensory processing system 206, which can be, e.g., a computer system, can control the operation of cameras 102, 104 to capture images of the region of interest 212 and sensors 208, 210 to capture motions of the device 201. Information from sensors 208, 210 can be applied to models of images taken by cameras 102, 104 to cancel out the effects of motions of the device 201, providing greater accuracy to the virtual experience rendered by device 201. Based on the captured images and motions of the device 201, sensory processing system 206 determines the position and/or motion of object 214 and render representations thereof to the user via assembly 203.

For example, as an action in determining the motion of object 214, sensory processing system 206 can determine which pixels of various images captured by cameras 102, 104 contain portions of object 214. In some implementations, any pixel in an image can be classified as an "object" pixel or a "background" pixel depending on whether that pixel contains a portion of object 214 or not. Object pixels can thus be readily distinguished from background pixels based on brightness. Further, edges of the object can also be readily detected based on differences in brightness between adjacent pixels, allowing the position of the object within each image to be determined. In some implementations, the silhouettes of an object are extracted from one or more images of the object that reveal information about the object as seen from different vantage points. While silhouettes can be obtained using a number of different techniques, in some implementations, the silhouettes are obtained by using cameras to capture images of the object and analyzing the images to detect object edges. Correlating object positions between images from cameras 102, 104 and cancelling out captured motions of the device 201 from sensors 208, 210 allows sensory processing system 206 to determine the location in 3D space of object 214, and analyzing sequences of images allows sensory processing system 206 to reconstruct 3D motion of object 214 using conventional motion algorithms or other techniques. See, e.g., U.S. patent application Ser. No. 13/414,485 (filed on Mar. 7, 2012) and U.S. Provisional Patent Application Nos. 61/724,091 (filed on Nov. 8, 2012) and 61/587,554 (filed on Jan. 7, 2012), the entire disclosures of which are hereby incorporated by reference.

Presentation interface 220 employs projection techniques in conjunction with the sensory based tracking in order to present virtual (or virtualized real) objects (visual, audio, haptic, and so forth) created by applications loadable to, or in cooperative implementation with, the optical assembly 203 of device 201 to provide a user of the device with a personal virtual experience. Projection can include an image or other visual representation of an object.

Figure 5:
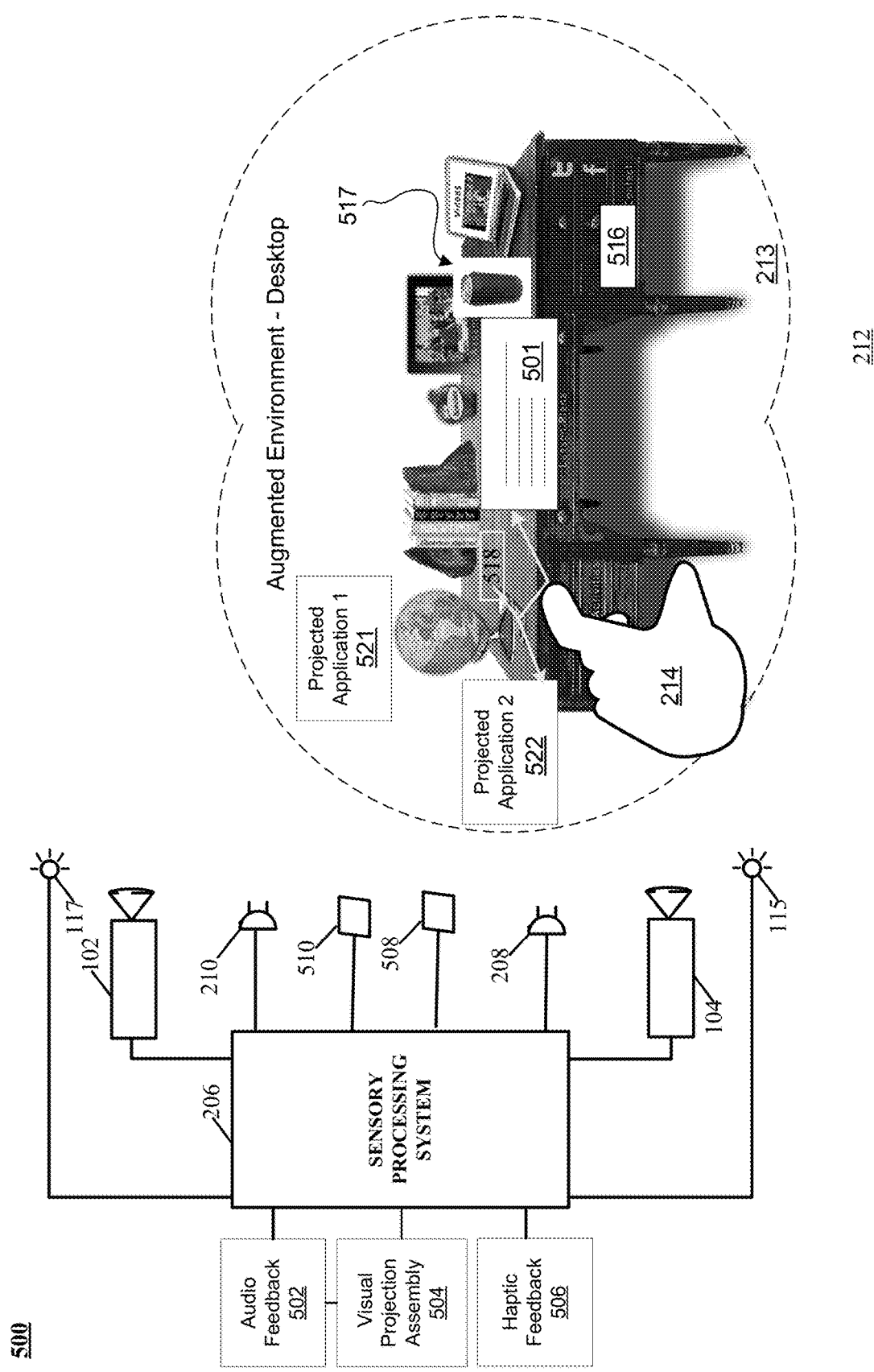
FIG. 5 shows an example augmented reality pass-through presented by a motion sensory and imaging capable device.

One implementation uses motion sensors and/or other types of sensors coupled to a motion-capture system to monitor motions within a real environment. A virtual object integrated into an augmented rendering of a real environment can be projected to a user of a portable device 201. Motion information of a user body portion can be determined based at least in part upon sensory information received from imaging 102, 104 or acoustic or other sensory devices. Control information is communicated to a system based in part on a combination of the motion of the portable device 201 and the detected motion of the user determined from the sensory information received from imaging 102, 104 or acoustic or other sensory devices. The virtual device experience can be augmented in some implementations by the addition of haptic, audio and/or other sensory information projectors. For example, with reference to FIG. 5, a visual projection assembly 504 can project an image of a page (e.g., virtual device 501) from a virtual book object superimposed upon a real world object, e.g., desk 216 being displayed to a user via live video feed; thereby creating a virtual device experience of reading an actual book, or an electronic book on a physical e-reader, even though no book nor e-reader is present. A haptic projector 506 can project the feeling of the texture of the "virtual paper" of the book to the reader's finger. An audio projector 502 can project the sound of a page turning in response to detecting the reader making a swipe to turn the page. Because it is an augmented reality world, the back side of hand 214 is projected to the user, so that the scene looks to the user as if the user is looking at the user's own hand(s).

Again with reference to FIG. 2, a plurality of sensors 208, 210 are coupled to the sensory processing system 206 to capture motions of the device 201. Sensors 208, 210 can be any type of sensor useful for obtaining signals from various parameters of motion (acceleration, velocity, angular acceleration, angular velocity, position/locations); more generally, the term "motion detector" herein refers to any device (or combination of devices) capable of converting mechanical motion into an electrical signal. Such devices can include, alone or in various combinations, accelerometers, gyroscopes, and magnetometers, and are designed to sense motions through changes in orientation, magnetism or gravity. Many types of motion sensors exist and implementation alternatives vary widely.

The illustrated system 200 can include any of various other sensors not shown in FIG. 2 for clarity, alone or in various combinations, to enhance the virtual experience provided to the user of device 201. For example, in low-light situations where free-form gestures cannot be recognized optically with a sufficient degree of reliability, system 206 may switch to a touch mode in which touch gestures are recognized based on acoustic or vibrational sensors. Alternatively, system 206 may switch to the touch mode, or supplement image capture and processing with touch sensing, when signals from acoustic or vibrational sensors are sensed. In still another operational mode, a tap or touch gesture may act as a "wake up" signal to bring the image and audio analysis system 206 from a standby mode to an operational mode. For example, the system 206 may enter the standby mode if optical signals from the cameras 102, 104 are absent for longer than a threshold interval.

It will be appreciated that the items shown in FIG. 2 are illustrative. In some implementations, it may be desirable to house the system 200 in a differently shaped enclosure or integrated within a larger component or assembly. Furthermore, the number and type of image sensors, motion detectors, illumination sources, and so forth are shown schematically for the clarity, but neither the size nor the number is the same in all implementations.

Figure 3:
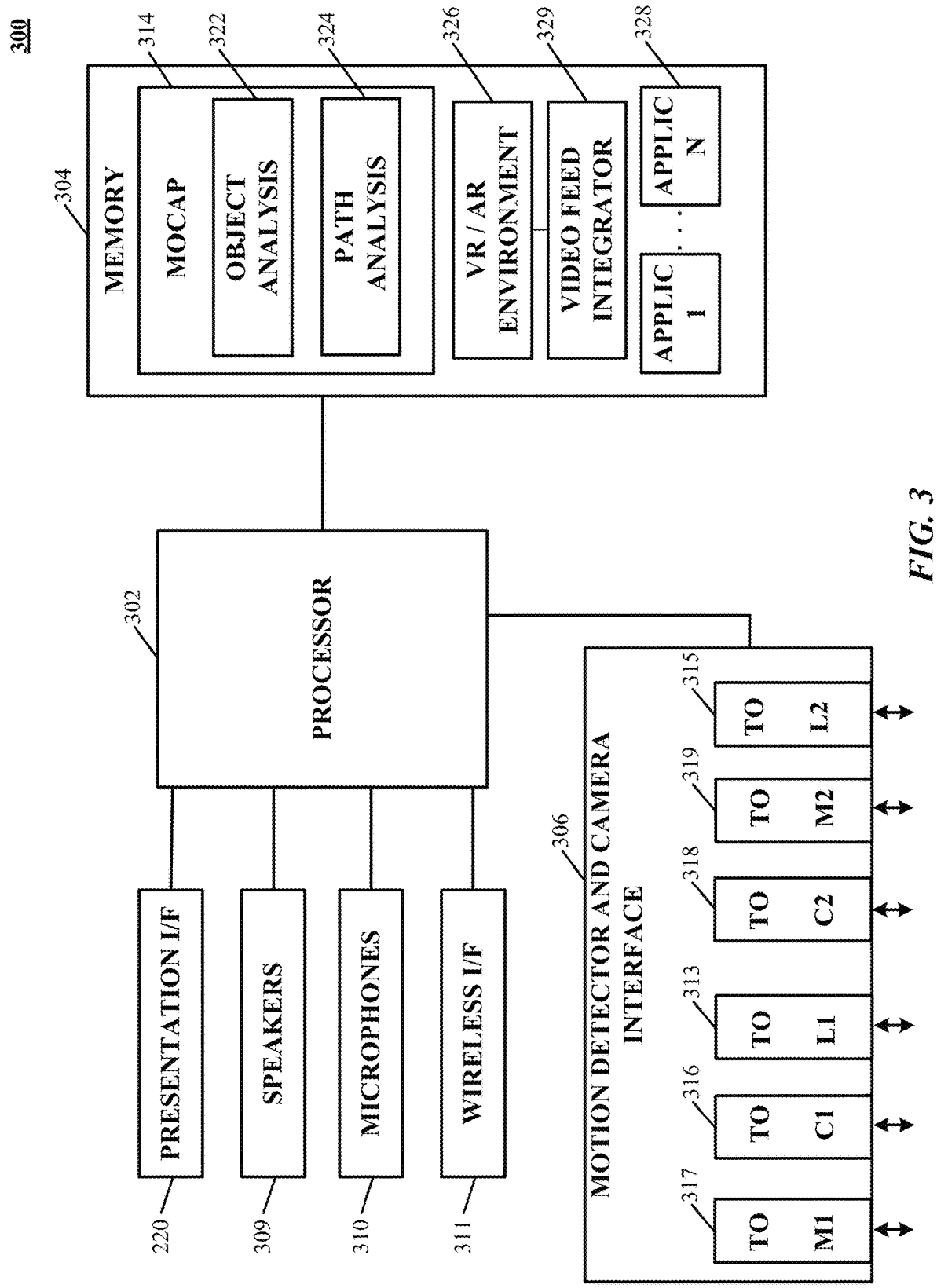
FIG. 3 shows a simplified block diagram of a computer system.

Refer now to FIG. 3, which shows a simplified block diagram of a computer system 300 for implementing sensory processing system 206. Computer system 300 includes a processor 302, a memory 304, a motion detector and camera interface 306, presentation interface 220, speaker(s) 309, a microphone(s) 310, and a wireless interface 311. Memory 304 can be used to store instructions to be executed by processor 302 as well as input and/or output data associated with execution of the instructions. In particular, memory 304 contains instructions, conceptually illustrated as a group of modules described in greater detail below, that control the operation of processor 302 and its interaction with the other hardware components. An operating system directs the execution of low-level, basic system functions such as memory allocation, file management and operation of mass storage devices. The operating system may be or include a variety of operating systems such as Microsoft WINDOWS operating system, the Unix operating system, the Linux operating system, the Xenix operating system, the IBM AIX operating system, the Hewlett Packard UX operating system, the Novell NETWARE operating system, the Sun Microsystems SOLARIS operating system, the OS/2 operating system, the BeOS operating system, the MACINTOSH operating system, the APACHE operating system, an OPENACTION operating system, iOS, Android or other mobile operating systems, or another operating system of platform.

The computing environment may also include other removable/non-removable, volatile/nonvolatile computer storage media. For example, a hard disk drive may read or write to non-removable, nonvolatile magnetic media. A magnetic disk drive may read from or writes to a removable, nonvolatile magnetic disk, and an optical disk drive may read from or write to a removable, nonvolatile optical disk such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The storage media are typically connected to the system bus through a removable or non-removable memory interface.

Processor 302 may be a general-purpose microprocessor, but depending on implementation can alternatively be a microcontroller, peripheral integrated circuit element, a CSIC (customer-specific integrated circuit), an ASIC (application-specific integrated circuit), a logic circuit, a digital signal processor, a programmable logic device such as an FPGA (field-programmable gate array), a PLD (programmable logic device), a PLA (programmable logic array), an RFID processor, smart chip, or any other device or arrangement of devices that is capable of implementing the actions of the processes of the technology disclosed.

Motion detector and camera interface 306 can include hardware and/or software that enables communication between computer system 300 and cameras 102, 104, as well as sensors 208, 210 (see FIG. 2). Thus, for example, motion detector and camera interface 306 can include one or more camera data ports 316, 318, illumination source ports 313, 315 and motion detector ports 317, 319 to which the cameras, illumination sources and motion detectors can be connected (via conventional plugs and jacks), as well as hardware and/or software signal processors to modify data signals received from the cameras and motion detectors (e.g., to reduce noise or reformat data) prior to providing the signals as inputs to a motion-capture ("mocap") program 314 executing on processor 302. In some implementations, motion detector and camera interface 306 can also transmit signals to the cameras, illumination sources and sensors, e.g., to activate or deactivate them, to control camera settings (frame rate, image quality, sensitivity, etc.), to control illumination settings (intensity, duration, etc.), to control sensor settings (calibration, sensitivity levels, etc.), or the like. Such signals can be transmitted, e.g., in response to control signals from processor 302, which may in turn be generated in response to user input or other detected events.

Instructions defining mocap program 314 are stored in memory 304, and these instructions, when executed, perform motion-capture analysis on images supplied from cameras and audio signals from sensors connected to motion detector and camera interface 306. In one implementation, mocap program 314 includes various modules, such as an object analysis module 322 and a path analysis module 324. Object analysis module 322 can analyze images (e.g., images captured via interface 306) to detect edges of an object therein and/or other information about the object's location. In some implementations, object analysis module 322 can also analyze audio signals (e.g., audio signals captured via interface 306) to localize the object by, for example, time distance of arrival, multilateration or the like. ("Multilateration is a navigation technique based on the measurement of the difference in distance to two or more stations at known locations that broadcast signals at known times. See Wikipedia, at http://en.wikipedia.org/w/index.php?title=Multilateration&oldid=523281858, on Nov. 16, 2012, 06:07 UTC). Path analysis module 324 can track and predict object movements in 3D based on information obtained via the cameras. Some implementations will include a Virtual Reality/Augmented Reality environment manager 326 provides integration of virtual objects reflecting real objects (e.g., hand 214) as well as synthesized objects 216 for presentation to user of device 201 via presentation interface 220 to provide a personal virtual experience 213. One or more applications 328 can be loaded into memory 304 (or otherwise made available to processor 302) to augment or customize functioning of device 201 thereby enabling the system 200 to function as a platform. Successive camera images are analyzed at the pixel level to extract object movements and velocities. Audio signals place the object on a known surface, and the strength and variation of the signals can be used to detect object's presence. If both audio and image information is simultaneously available, both types of information can be analyzed and reconciled to produce a more detailed and/or accurate path analysis. A video feed integrator 329 provides integration of live video feed from the cameras 102, 104 and one or more virtual objects (e.g., 501 of FIG. 5). Video feed integrator 329 governs processing of video information from disparate types of cameras 102, 104. For example, information received from pixels sensitive to IR light and from pixels sensitive to visible light (e.g., RGB) can be separated by integrator 329 and processed differently. Image information from IR sensors can be used for gesture recognition, while image information from RGB sensors can be provided as a live video feed via presentation interface 220. Information from one type of sensor can be used to enhance, correct, and/or corroborate information from another type of sensor. Information from one type of sensor can be favored in some types of situational or environmental conditions (e.g., low light, fog, bright light, and so forth). The device can select between providing presentation output based upon one or the other types of image information, either automatically or by receiving a selection from the user. Integrator 329 in conjunction with VR/AR environment manager 326 control the creation of the environment presented to the user via presentation interface 220.

Presentation interface 220, speakers 309, microphones 310, and wireless network interface 311 can be used to facilitate user interaction via device 201 with computer system 300. These components can be of generally conventional design or modified as desired to provide any type of user interaction. In some implementations, results of motion capture using motion detector and camera interface 306 and mocap program 314 can be interpreted as user input. For example, a user can perform hand gestures or motions across a surface that are analyzed using mocap program 314, and the results of this analysis can be interpreted as an instruction to some other program executing on processor 302 (e.g., a web browser, word processor, or other application). Thus, by way of illustration, a user might use upward or downward swiping gestures to "scroll" a webpage currently displayed to the user of device 201 via presentation interface 220, to use rotating gestures to increase or decrease the volume of audio output from speakers 309, and so on. Path analysis module 324 may represent the detected path as a vector and extrapolate to predict the path, e.g., to improve rendering of action on device 201 by presentation interface 220 by anticipating movement.

It will be appreciated that computer system 300 is illustrative and that variations and modifications are possible. Computer systems can be implemented in a variety of form factors, including server systems, desktop systems, laptop systems, tablets, smart phones or personal digital assistants, and so on. A particular implementation may include other functionality not described herein, e.g., wired and/or wireless network interfaces, media playing and/or recording capability, etc. In some implementations, one or more cameras and two or more microphones may be built into the computer rather than being supplied as separate components. Further, an image or audio analyzer can be implemented using only a subset of computer system components (e.g., as a processor executing program code, an ASIC, or a fixed-function digital signal processor, with suitable I/O interfaces to receive image data and output analysis results).

While computer system 300 is described herein with reference to particular blocks, it is to be understood that the blocks are defined for convenience of description and are not intended to imply a particular physical arrangement of component parts. Further, the blocks need not correspond to physically distinct components. To the extent that physically distinct components are used, connections between components (e.g., for data communication) can be wired and/or wireless as desired. Thus, for example, execution of object analysis module 322 by processor 302 can cause processor 302 to operate motion detector and camera interface 306 to capture images and/or audio signals of an object traveling across and in contact with a surface to detect its entrance by analyzing the image and/or audio data.

Figure 4:
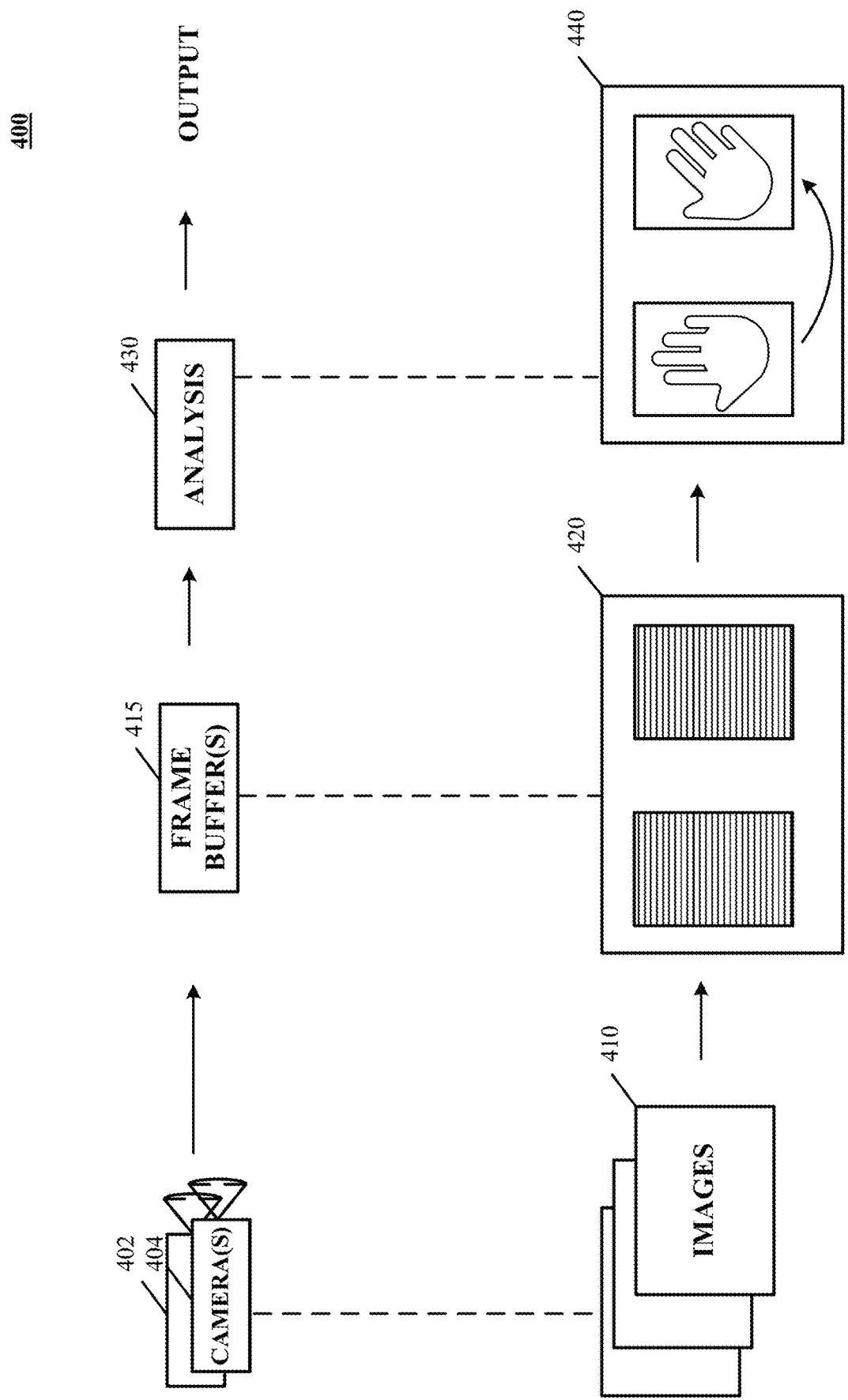
FIG. 4 shows basic operations and functional units involved in motion capture and image analysis.

FIG. 4 depicts the basic operations and functional units 400 involved in motion capture and image analysis in accordance with implementations of the technology disclosed. As shown in FIG. 4, the camera(s) 402, 404 record digital images 410 of a scene. Each digital image is captured as an array of pixel values by the associated camera's image sensor, and the digital images are transferred—either in "raw" format or following conventional preprocessing—to one or more frame buffers 415. A frame buffer is a partition or dedicated segment of volatile memory that stores a "bitmapped" image frame 420 corresponding to the pixel values of an image as output by the camera that recorded it. The bitmap is generally organized conceptually as a grid, with each pixel mapped one-to-one or otherwise to output elements of a display. It should be stressed, however, that the topology of how memory cells are physically organized within the frame buffers 415 does not matter and need not conform directly to the conceptual organization.

The number of frame buffers included in a system generally reflects the number of images simultaneously analyzed by the analysis system or module 430, which is described in greater detail below. Briefly, analysis module 430 analyzes the pixel data in each of a sequence of image frames 420 to locate objects therein and track their movement over time (as indicated at 440). This analysis can take various forms, and the algorithm performing the analysis dictates how pixels in the image frames 420 are handled. For example, the algorithm implemented by analysis module 430 can process the pixels of each frame buffer on a line-by-line basis— i.e., each row of the pixel grid is successively analyzed. Other algorithms can analyze pixels in columns, tiled areas, or other organizational formats.

In various implementations, the motion captured in a series of camera images is used to compute a corresponding series of output images for display on the display 220. For example, camera images of a moving hand can be translated into a wire-frame or other graphic depiction of the hand by the processor 302. Alternatively, hand gestures can be interpreted as input used to control a separate visual output; by way of illustration, a user can be able to use upward or downward swiping gestures to "scroll" a webpage or other document currently displayed, or open and close her hand to zoom in and out of the page. In any case, the output images are generally stored in the form of pixel data in a frame buffer, e.g., one of the frame buffers 415. A video display controller reads out the frame buffer to generate a data stream and associated control signals to output the images to the assembly 203. Video display control provided by presentation interface 220 can be provided along with the processor 302 and memory 304 on-board the motherboard of the computer system 300, and can be integrated with the processor 302 or implemented as a co-processor that manipulates a separate video memory. As noted, the computer system 300 can be equipped with a separate graphics or video card that aids with generating the feed of output images for the assembly 203. One implementation includes a video card generally having a graphics processing unit (GPU) and video memory, and is useful, in particular, for complex and computationally expensive image processing and rendering. The graphics card can include the frame buffer and the functionality of the video display controller (and the on-board video display controller can be disabled). In general, the image-processing and motion-capture functionality of the system can be distributed between the GPU and the main processor 302 in various ways.

Suitable algorithms for motion-capture program 314 are described below as well as, in more detail, in U.S. Ser. Nos. 61/587,554, 13/414,485, 61/724,091, 13/724,357, and Ser. No. 13/742,953, filed on Jan. 17, 2012, Mar. 7, 2012, Nov. 8, 2012, Dec. 21, 2012 and Jan. 16, 2013, respectively, which are hereby incorporated herein by reference in their entirety. The various modules can be programmed in any suitable programming language, including, without limitation high-level languages such as C, C++, C #, OpenGL, Ada, Basic, Cobra, FORTRAN, Java, Lisp, Perl, Python, Ruby, or Object Pascal, or low-level assembly languages.

Again with reference to FIG. 4, the modes of operation of a device equipped with a motion sensory control device can determine the coarseness of the data provided to the image-analysis module 430, the coarseness of its analysis, or both in accordance with entries in a performance database. For example, during a wide-area mode of operation, the image-analysis module 430 can operate on every image frame and on all data within a frame, capacity limitations can dictate analysis of a reduced amount of image data per frame (i.e., resolution) or discarding of some frames altogether if the data in each of the frame buffers 415 are organized as a sequence of data lines. The manner in which data is dropped from the analysis can depend on the image-analysis algorithm or the uses to which the motion-capture output is put. In some implementations, data is dropped in a symmetric or uniform fashion—e.g., every other line, every third line, etc. is discarded up to a tolerance limit of the image-analysis algorithm or an application utilizing its output. In other implementations, the frequency of line dropping can increase toward the edges of the frame. Still other image-acquisition parameters that can be varied include the frame size, the frame resolution, and the number of frames acquired per second. In particular, the frame size can be reduced by, e.g., discarding edge pixels or by resampling to a lower resolution (and utilizing only a portion of the frame buffer capacity). Parameters relevant to acquisition of image data (e.g., size and frame rate and characteristics) are collectively referred to as "acquisition parameters," while parameters relevant to operation of the image-analysis module 430 (e.g., in defining the contour of an object) are collectively referred to as "image-analysis parameters." The foregoing examples of acquisition parameters and image-analysis parameters are representative only, and not limiting.

Acquisition parameters can be applied to the cameras 402, 404 and/or to the frame buffers 415. The camera 402, 404 for example, can be responsive to acquisition parameters in operating the cameras 402, 404 to acquire images at a commanded rate, or can instead limit the number of acquired frames passed (per unit time) to the frame buffers 415. Image-analysis parameters can be applied to the image-analysis module 430 as numerical quantities that affect the operation of the contour-defining algorithm.

The desirable values for acquisition parameters and image-analysis parameters appropriate to a given level of available resources can depend, for example, on the characteristics of the image-analysis module 430, the nature of the application utilizing the mocap output, and design preferences. Whereas some image-processing algorithms can be able to trade off a resolution of contour approximation against input frame resolution over a wide range, other algorithms may not exhibit much tolerance at all— requiring, for example, a minimal image resolution below which the algorithm fails altogether.

Some implementations can be applied to virtual reality or augmented reality applications. For example, and with reference to FIG. 5, which illustrates a system 500 for projecting a virtual device augmented reality experience 213 including a view of real objects, e.g., a desk surface medium 516, and one or more virtualized objects (e.g., object 501) according to one implementation of the technology disclosed. System 500 includes a processing system 206 controlling a variety of sensors and projectors, such as for example one or more cameras 102, 104 (or other image sensors) and optionally some illumination sources 115, 117 comprising an imaging system. Optionally, a plurality of vibrational (or acoustical) sensors 508, 510 positioned for sensing contacts with desk 516 can be included. Optionally projectors under control of system 206, such as an optional audio projector 502 to provide for example audio feedback, optional video projector 504, an optional haptic projector 506 to provide for example haptic feedback to a user to augment reality. For further information on projectors, reference may be had to "Visio-Tactile Projector" Youtube (https://www.youtube.com/watch?v=BbOhNMxxewg) (accessed Jan. 15, 2014). In operation, sensors and projectors are oriented toward a region of interest 212, that can include at least a portion of a desk 516, or free space in which an object of interest 214 (in this example, a hand) moves along the indicated path 518. One or more applications 521 and 522 can be provided as virtual objects integrated into the display of the augmented reality 213. Accordingly, user (e.g., owner of hand 214) is able to interact with real objects e.g., desk 516, cola 517, in the same environment as virtual objects 501.

In some implementations, a virtual device is projected to a user. Projection can include an image or other visual representation of an object. For example, visual projection mechanism 504 of FIG. 5 can project a page (e.g., virtual device 501) from a book into augmented reality environment 213 (e.g., surface portion 516 and/or surrounding space 212) of a reader; thereby creating a virtual device experience of reading an actual book, or an electronic book on a physical e-reader, even though no book nor e-reader is present. In some implementations, optional haptic projector 506 can project the feeling of the texture of the "virtual paper" of the book to the reader's finger. In some implementations, optional audio projector 502 can project the sound of a page turning in response to detecting the reader making a swipe to turn the page.

What is claimed is:

1. A wearable device, including:
   one or more imaging sensors including light sensing pixels arranged to provide imaging information for a scene being viewed by a user; and
   a controller including a processor and memory storing executable instructions coupled to the imaging sensors to control operation thereof, including:
      obtaining imaging information for at least one hand of the user;
      determining from the imaging information, gesture information from the at least one hand of the user as captured by the imaging information; and
      providing a live video feed from the imaging information through a presentation interface, wherein the user is blocked from viewing real world surroundings of the user in the scene, including any motions made by the at least one hand of the user, except for the live video feed that is presented to the user by the wearable device.

2. The wearable device of claim 1, wherein the controller further provides:
   receiving application information; and
   providing the application information received as virtual objects integrated with the live video feed from the imaging information for projecting an augmented reality via the presentation interface.

3. The wearable device of claim 2, wherein the controller further provides:
   projecting to the user wearing the wearable device, haptic feedback for the augmented reality.

4. The wearable device of claim 2, wherein the controller further provides:
   projecting to the user wearing the wearable device, audio feedback for the augmented reality.

5. The wearable device of claim 2, wherein the controller further includes a contact sensor, and wherein the controller further provides:
   receiving contact sensory input indicating contact between the user wearing the wearable device and the contact sensor either directly or through a physical object; and
   reflecting contact sensed into the augmented reality.

6. The wearable device of claim 2, further including a motion sensor; and wherein the controller further provides:
   determining first and second positional information of the motion sensor with respect to a point in space at first and second times;
   computing movement information for the wearable device with respect to the point in space based upon differences information determined using the first and second positional information; and
   reflecting movement information as computed for the wearable device in display of application information through the presentation interface.

7. The wearable device of claim 2, wherein the controller further provides:
   determining first and second positional information of the wearable device with respect to a point in space at first and second times, using difference information; wherein difference information is determined from apparent motion of the point in space in captured images captured at the first and second times;
   computing movement information for the wearable device with respect to the point in space based upon the first and second positional information determined; and
   reflecting movement information as computed for the wearable device in display of application information through the presentation interface.

8. The wearable device of claim 2, wherein the controller further provides:
   capturing imaging information for control objects within view of the imaging sensors; wherein the imaging information for control objects of interest is used to determine gesture information indicating a command to a machine under control; and
   based upon the gesture information, manipulating one or more projected virtual objects of the augmented reality.

9. The wearable device of claim 8, wherein the controller further provides:
   based upon the gesture information, updating a state of an application corresponding to the one or more projected virtual objects of the augmented reality.

10. The wearable device of claim 2, wherein the controller further provides:
    projecting a virtual device configured to emulate a real device;
    receiving gestural manipulations of the virtual device sensed from movement of the at least one hand of the user;
    reflecting the gestural manipulations in; (i) an updated status of an application corresponding to the virtual device; and (ii) the virtual device as projected; and
    thereby providing the user wearing the wearable device a virtual device experience of interacting with the real device emulated.

11. The wearable device of claim 10, wherein the controller further provides:

projecting to the user, a back side of a virtual hand, so that the scene looks to the user as if the user is looking at user's real hand(s).

12. The wearable device of claim 1, wherein the controller further provides:
extracting using a first set of light sensing pixels, gross features of a real-world space.

13. The wearable device of claim 12, wherein gross features of the real-world space include outlines of objects.

14. The wearable device of claim 1, wherein the controller further provides:
extracting using a second set of light sensing pixels, fine features of a real-world space.

15. The wearable device of claim 14, wherein fine features of the real-world space includes at least one selected from a surface texture of the real-world space, edges of the real-world space, curvatures of the real-world space, surface texture of objects in the real-world space, and edges of objects in the real-world space.

16. The wearable device of claim 1, wherein the controller further provides:
determining ambient lighting conditions; and
adjusting display of output based upon the ambient lighting conditions determined.

17. The wearable device of claim 1, further including:
one or more illumination sources of artificial illumination; and
one or more fasteners that fasten the imaging sensors and the illumination sources to one selected from a mounting surface in a wearable presentation device, a cavity in a wearable presentation device, a mounting surface in a portable presentation device, and a cavity in a portable presentation device.

18. A method, including:
receiving from one or more imaging sensors including light sensing pixels, imaging information for a scene being viewed by a user of wearable device that blocks the scene being viewed;
obtaining imaging information for at least one hand of the user using the one or more imaging sensors;
determining, from the imaging information, gesture information from the at least one hand of the user as captured by from the imaging information; and
providing a live video feed from the imaging information through a presentation interface;
wherein the user is blocked from viewing real world surroundings of the user in the scene, including any motions made by the at least one hand of the user, except for the live video feed that is presented to the user by the wearable device.

19. A non-transitory computer readable memory storing instructions that, when executed by one or more processors, perform actions including:
receiving from one or more imaging sensors including light sensing pixels, imaging information for a scene being viewed by a user of a wearable device that blocks the scene being viewed;
obtaining imaging information for at least one hand of the user using the one or more imaging sensors;
determining, from the imaging information, gesture information from the at least one hand of the user as captured by from the imaging information; and
providing a live video feed from the imaging information through a presentation interface; and
wherein the user is blocked from viewing real world surroundings of the user in the scene, including any motions made by the at least one hand of the user, except for the live video feed that is presented to the user by the wearable device.

20. The wearable device of claim 1, wherein live video feed as presented comprises a near real time pass-through of imaging information and a time delay introduced by automated processing performance between occurrence of event as captured by the one or more imaging sensors and display of the near real time pass-through of imaging information as processed.

* * * * *

UNITED STATES PATENT AND TRADEMARK OFFICE
CERTIFICATE OF CORRECTION

PATENT NO. : 12,095,969 B2
APPLICATION NO. : 18/374661
DATED : September 17, 2024
INVENTOR(S) : David S. Holz, Neeloy Roy and Hongyuan He Page 1 of 1

It is certified that error appears in the above-identified patent and that said Letters Patent is hereby corrected as shown below:

In the Claims

Claim 18, Column 18, Line 5, delete "by from" and insert -- by --, therefor.
Claim 19, Column 18, Line 24, delete "by from" and insert -- by --, therefor.

Signed and Sealed this
Twenty-fifth Day of March, 2025

Coke Morgan Stewart
*Acting Director of the United States Patent and Trademark Office*